(12) United States Patent
Agarwal et al.

(10) Patent No.: US 12,242,488 B2
(45) Date of Patent: Mar. 4, 2025

(54) DYNAMIC FILTER RECOMMENDATIONS

(71) Applicant: Pinterest, Inc., San Francisco, CA (US)

(72) Inventors: Navin Agarwal, San Mateo, CA (US); Judy Yi-Chun Hsieh, San Francisco, CA (US); Debbie Ayano Limongan, San Mateo, CA (US); Lianghao Chen, San Jose, CA (US); Amit Aggarwal, Los Altos, CA (US); Julie Bornstein, Hillsborough, CA (US)

(73) Assignee: Pinterest, Inc., San Francisco, CA (US)

( * ) Notice: Subject to any disclaimer, the term of this patent is extended or adjusted under 35 U.S.C. 154(b) by 0 days.

(21) Appl. No.: 18/341,589

(22) Filed: Jun. 26, 2023

(65) Prior Publication Data
US 2023/0342365 A1    Oct. 26, 2023

Related U.S. Application Data

(63) Continuation of application No. 16/712,590, filed on Dec. 12, 2019, now Pat. No. 11,727,014.

(51) Int. Cl.
| | | |
|---|---|---|
| G06F 16/20 | (2019.01) | |
| G06F 16/2457 | (2019.01) | |
| G06N 20/00 | (2019.01) | |
| G06Q 30/0601 | (2023.01) | |
| H04L 67/50 | (2022.01) | |
| G06N 3/08 | (2023.01) | |

(52) U.S. Cl.
CPC ......... G06F 16/2457 (2019.01); G06N 20/00 (2019.01); G06Q 30/0631 (2013.01); H04L 67/535 (2022.05); *G06N 3/08* (2013.01)

(58) Field of Classification Search
None
See application file for complete search history.

(56) References Cited

U.S. PATENT DOCUMENTS

| | | | | |
|---|---|---|---|---|
| 7,698,261 B1 * | 4/2010 | Khoshnevisan | ........ | G06F 16/35 |
| | | | | 707/999.003 |
| 2005/0256865 A1 * | 11/2005 | Ma | ........................ | G06F 16/951 |
| | | | | 707/999.005 |

* cited by examiner

*Primary Examiner* — Belix M Ortiz Ditren
(74) *Attorney, Agent, or Firm* — Haynes and Boone, LLP

(57) ABSTRACT

A user preference hierarchy is determined from user response to images. Images may be tagged using machine learning models trained to determine values for images. Products are clustered according to product vectors. Images of products within a cluster are clustered according to composition and groups of images are selected from image clusters for soliciting feedback regarding user preference for products of a cluster. Feedback is used to train a user preference model to estimate affinity for a product vector. A user may provide feedback regarding a price point and products are weighted according to a distribution about the price point. The distribution may be asymmetrical according to direction of movement of the price point. Filters may be dynamically defined and presented to a user based on popularity and frequency of occurrence of attribute-value pairs of search results and based on feedback regarding the search results.

20 Claims, 19 Drawing Sheets

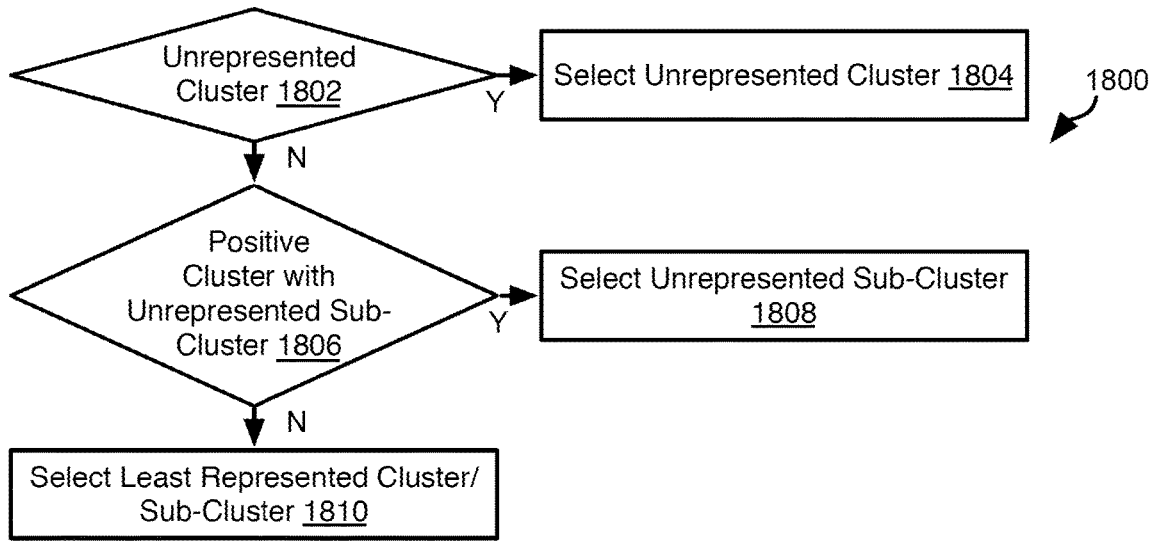
Fig. 18
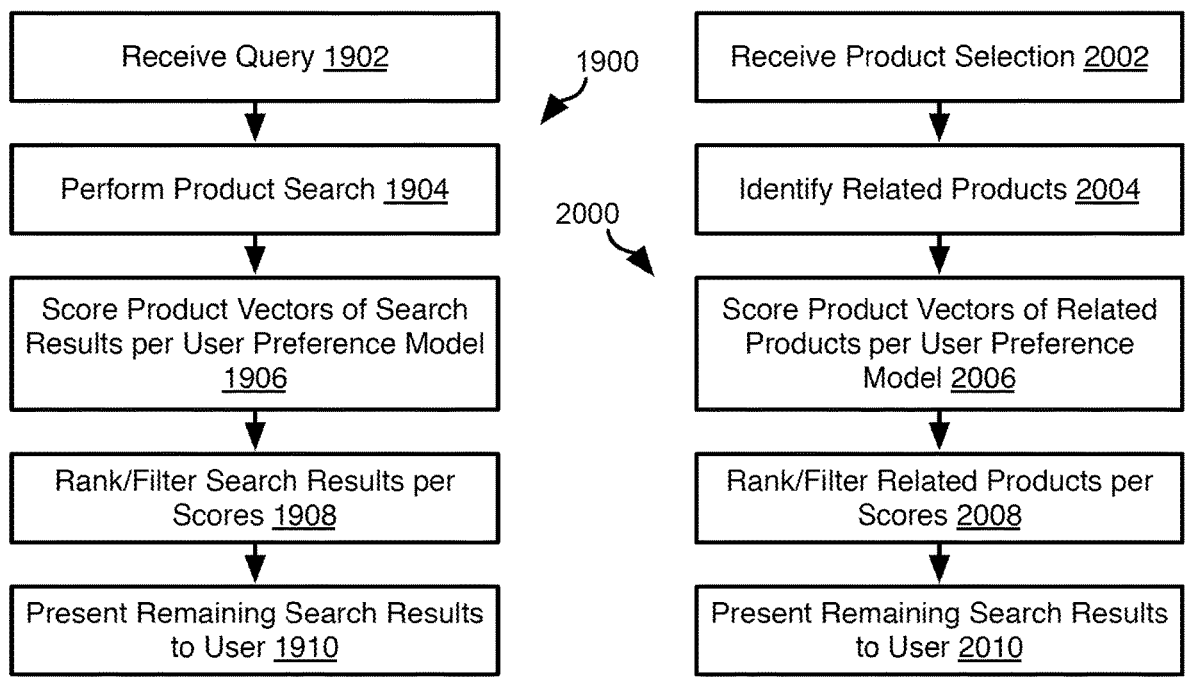
Fig. 19
Fig. 20

DYNAMIC FILTER RECOMMENDATIONS

CROSS-REFERENCE TO PRIOR APPLICATIONS

This application is a continuation application of and claims benefit to U.S. patent application Ser. No. 16/712,590, filed on Dec. 12, 2019 and entitled "Dynamic Filter Recommendations," which is hereby incorporated by reference herein in its entirety.

BACKGROUND

Field of the Invention

This invention relates to collecting user feedback and training a machine learning model using the user feedback.

Background of the Invention

Retailers seek to match consumers with products that will meet their needs. Retailers may observe search terms, product selections, and other behaviors in order to determine products that are of interest to a consumer. However, user preferences are very subjective and difficult to detect and represent in a computational system. This is particularly true with respect to consumer's tastes in clothing. Even where a user's preferences are known generally, it can be difficult to predict what a user is looking for during any particular browsing session.

What is needed is an improved approach for detecting consumer preferences and identifying suitable products corresponding to those preferences, particularly with reference to product price.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 18 is a process flow diagram of a method for selecting a cluster for collecting feedback in accordance with an embodiment of the present invention;

FIG. 19 is a process flow diagram of a method for providing search results using the user preference model in accordance with an embodiment of the present invention;

FIG. 20 is a process flow diagram of a method for generating product recommendations in accordance with an embodiment of the present invention;

DETAILED DESCRIPTION

Figure 1:
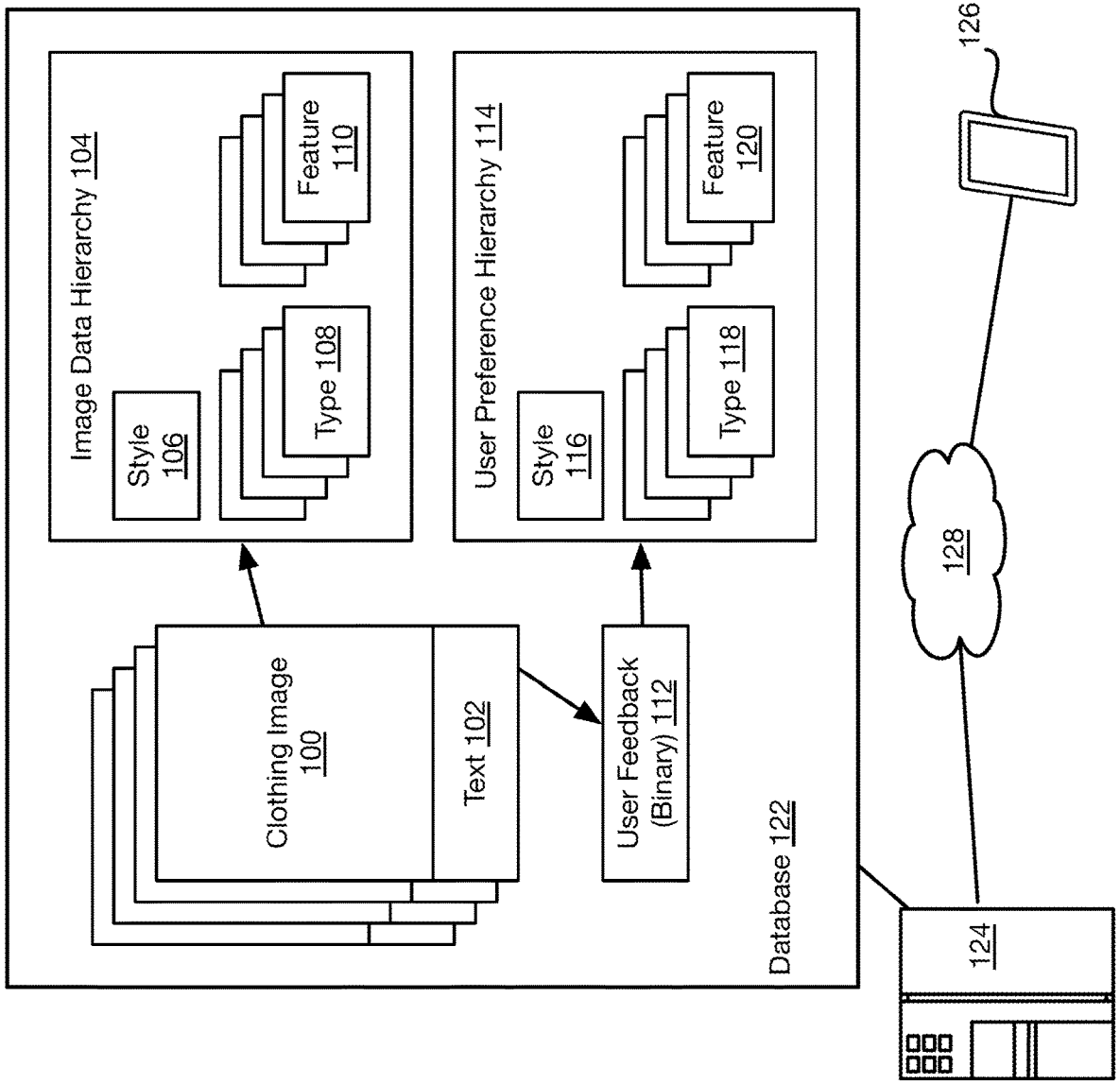
FIG. 1 is a diagram illustrating hierarchical data describing clothing and a user's preferences in accordance with an embodiment of the present invention.

Referring to FIG. 1, the approach described herein enables a computing device to generate product recommendations that take into account the preferred style and tastes of a user. To that end, the approach described herein may operate on a collection of clothing images 100 that depict clothing or a person wearing items of clothing. Each image 100 may be annotated with textual data 102. For example, textual data 102 may be prose, e.g. a description of the clothing for marketing purposes. Textual data 102 may identify the clothing depicted in the image 100, such as in the form of a SKU (stock keeping unit) or other identifier. Textual data 102 may include one or more attribute/value pairs, e.g. (color, blue) describing features or attributes for one or more items of clothing depicted in the image 100. Where multiple items of clothing are shown, each item of clothing may be identified, and its corresponding attribute/value pairs associated with its identifier in the text 102.

A clothing image 100 and its text 102 may be evaluated to generate an image data hierarchy 104. The data hierarchy 104 represents descriptive data for the image 100 in order from more subjective to less subjective (more objective). For example, attributes such as color, material type (knit/weave), article type (shirt, pants, etc.) may be known with specificity. In contrast, concepts such as "style" are subjective and less readily described. In the illustrated embodiment, there are three levels in the hierarchy: style 106, type 108, and feature 110.

Style 106 indicates an overall style of the garment as judged by a human or an artificial intelligence model trained according to human judgment. The style 106 may be one of a finite number of styles and a single image may be assigned multiple styles 106. Examples of styles may include Vintage, Bohemian (also referred to as Boho), Chic, Artsy, Sexy, Casual, Sophisticated, Tomboy, Rocker, and Preppy. Of course, this is only an example of styles and others may also be used.

The types 108 of a clothing image 100 are less subjective than the style but still describe a subjective assessment of the type of the clothing shown in the image. For example, one type may be "colorful," which is more objective than a style but is still subjective in that what is considered "colorful" is a matter of human judgment. Another examples of type may include "skin baring" to describe clothing that is low cut or otherwise exposes more skin than other types of clothing. Other types may include "conservative," "modest," "tight-fitting," "loose-fitting," a seasonal descriptor (spring, fall, winter, summer), or the like.

The features 110 of a clothing image 100 are more objective than the style 106 or type 108 and indicate features that are readily determinable from the text 102 or by observation. As noted above, features 110 may include colors present in the depicted clothing, the type of material (knit, woven), a length of sleeves or legs (full, short, capris, ¾, etc.), whether an items of clothing is striped, a descriptor of an image included on the clothing, a description of a pattern on the clothing (herring bone, hound's-tooth, pinstripes, etc.), intended gender of clothing, or any other objective description of the attributes of clothing shown in the image 100. As noted above, each item of clothing shown in the image 100 may include an identifier and a set of features 110 for that item of clothing associated with that identifier.

In the illustrated example, there are three levels in the image data hierarchy 104. In other embodiments, more levels may also be used. For example, the types 108 may be divided into sub-types at a level between the types 108 and the features 110.

As will be described in greater detail below, a user may provide feedback 112 regarding clothing images 100. The feedback may be in the form of a binary input (yes/no or like/dislike). The image data hierarchy 104 of the images and the binary feedback 112 may be used to generate a user preference hierarchy 114, that may have corresponding style 116, type 118, and features 120. The style 116, types 118, and features 120 are defined in the same way as the style 106, type 108, and features 110. In particular, the style 116 indicates a style 106 in which the user has shown interest, the types 118 indicate the types 108 in which the user has shown interest, and features 120 indicate features 110 of interest to the user. The manner in which the user preference hierarchy 114 is generated is described in detail below.

Note that a user may have interest in multiple styles 116. Accordingly, there may be multiple user preference hierarchies 114 for a user, each with its corresponding style 116, types 118, and features 120.

The images 100, image data hierarchy 104, user feedback 112, and user preference hierarchy 114 may be maintained in a database 122 hosted or accessed by a server system 124. In particular, the server system 124 may perform the methods disclosed herein for creating and using the user preference hierarchies 114 of various users.

The server system 124 may be in data communication with user devices 126 of the various users. The user devices 126 may be embodied as a smartphone, tablet computer, laptop computer, desktop computer, wearable computing device, or other computing device accessed by a user. The server system 124 may be in data communication with the user devices 126 by means of a network 128, which may include some or all of the Internet, a wide area network (WAN), local area network (LAN), or any type of wired or wireless network.

Figure 2:
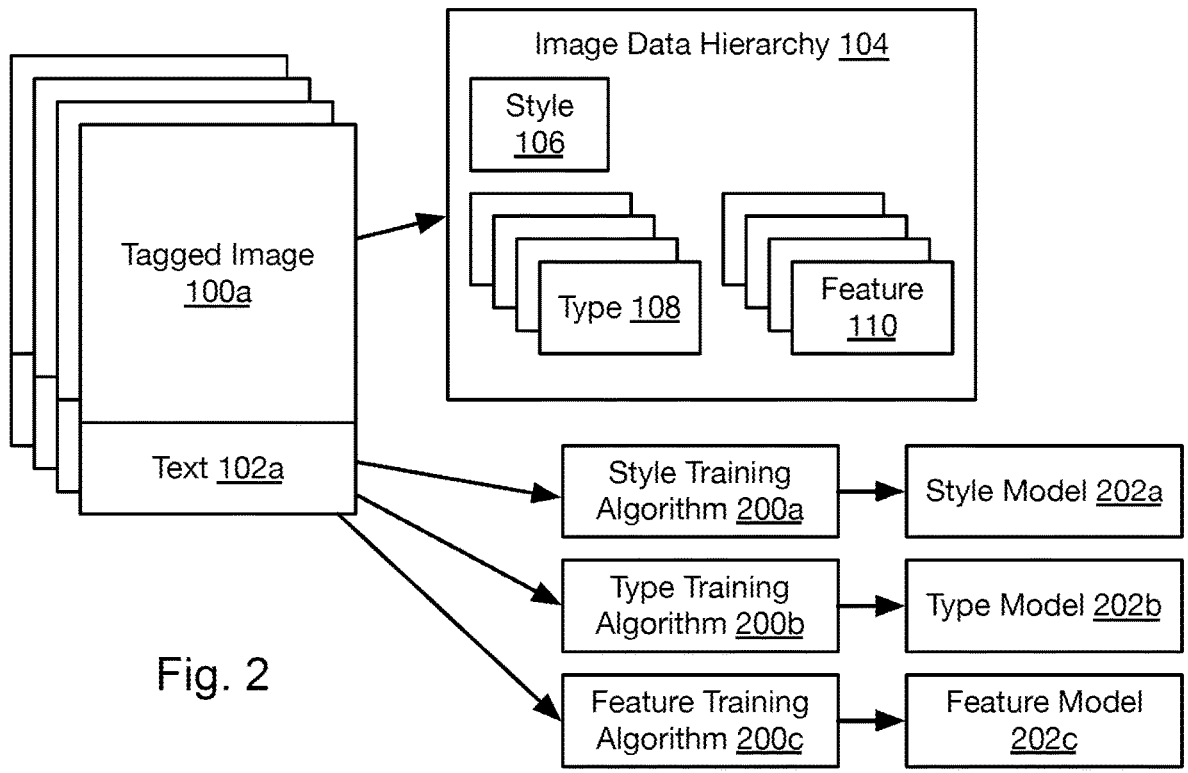
FIG. 2 is a schematic block diagram illustrating an approach for training classifiers in accordance with an embodiment of the present invention.

Referring to FIG. 2, a machine learning model may be trained to classify images to identify some or all of style, type, and features. To that end, images 100a with corresponding text 102a may be manually classified by a human, such as someone with experience in fashion, with values for style 106, types 108, and features 110. As known in the art, it may require many hundreds or thousands of tagged images 100a in order to train a machine learning model.

The tagged images 100a may be processed by some or all of a style training algorithm 200a, type training algorithm 200b, and a feature training algorithm 200c. Each of the algorithms 200a-200c may be implemented according to any approach for implementing artificial intelligence as known in the art, such as a neural network, deep neural network, convolution neural network, or other type of machine learning algorithm. The algorithms 200a-200c may process both an image 100a and its corresponding text 102a.

For example, each algorithm may be trained by a plurality of training data sets where each training data set includes a tagged image 100a (which may include its text 102a) as an input and a value in the image data hierarchy 104 of the tagged image 100a as a desired output. For the style training algorithm 200a, the desired output will be the style 106. For the type training algorithm 200b, the desired output will be the types 108. For the feature training algorithm 200c, will be the features 110.

Note that in some implementation a separate model may be trained for each possible value of a style 106, type 108, or feature 110. For example, a model may be trained to identify Bohemian style, another model for Vintage style etc. Accordingly, training by the style training algorithm may include taking as an input a set of tagged images 100a tagged with a plurality of styles 106. For each style represented among the styles 106, a model will be trained such that images 100a tagged with the each style are designated as a having the attribute to be identified and those that are not tagged with the each style will be designated as lacking the attribute to be identified. In this manner, the trained model will be trained to distinguish between photographs showing clothing having the each style and those that do not.

The type training algorithm 200b may operate in a like manner: for each type 108 represented among the tagged images 100a, a model may be trained to distinguish between images having clothing with the each type and those that do not.

The feature training algorithm 200c may operate in a like manner: for each feature 110 represented among the tagged images 100a, a model may be trained to distinguish between images having clothing with the each feature and those that do not. Note that features are the least subjective and may be identifiable from the attribute/value pairs of the text 102a in some instances.

In some instances, the identification of one level in the hierarchy may be facilitated by information from a lower level in the hierarchy. For example, the type training algorithm 200b may process training data sets such that each set includes as a desired output a tagged type 108 of an image 100a and as an input the image 100a, its text 102a, and features 110. Likewise, the style training algorithm 200a may process training data sets such that each set includes as a desired output a tagged style 106 of an image 100a and as an input the image 100a, its text 102a, tagged features 110, and any tagged types 108.

The output of the algorithms 200a-200c are corresponding models 202a-202c. As noted above, the result of a particular algorithm 200a-200c may be a model for each possible value at the level of the data hierarchy that is the subject algorithm (e.g., style training algorithm outputs models for each style represented in the tagged images 100a).

Figure 3:
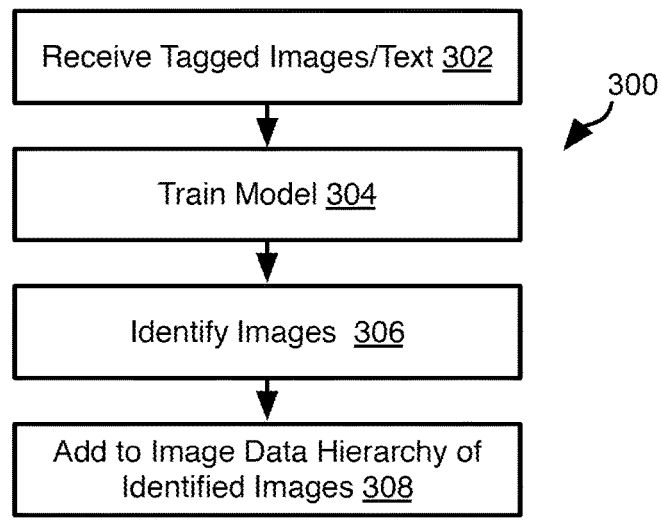
FIG. 3 is a process flow diagram of a method for training classifiers in accordance with an embodiment of the present invention.

FIG. 3 illustrates a method 300 for training a machine learning model 202a-202c. The method 300 may be executed by the server system 124 or some other computer system. The method 300 may be repeated separately for each hierarchy level (style 106, type 108, feature 110) referred to as the "subject level." The method 300 may be repeated separately for each value ("the subject value") of the subject level, e.g. each style for the style level, each type for the type level, and each feature for the feature level (e.g., each value for each attribute/value pair).

The method 300 may include receiving 302 a set of tagged images, at least a portion of which are tagged with the subject value at the subject level and at least a portion of which are not tagged with the subject value at the subject level. As noted above, many hundreds or thousands of images may be received 302.

The method 300 may include training 304 a machine learning model to distinguish between images tagged with the subject value at the subject level and those that are not. The method by which step 304 is performed may be according to any approach for machine learning and artificial intelligence known in the art. In particular, convolution neural networks are particularly suitable for performing image-based artificial intelligence tasks.

The method 300 may further include identifying 306 images having the subject value at the subject level. In particular, images that were not previously tagged by a human operator may be processed according to the machine learning model trained at step 304 in order to identify those images that have the subject value at the subject level. The data considered may include the image itself, its text 102, and possibly any prior determinations of values of other levels in the image data hierarchy using other models.

In particular, the model may be trained to produce a confidence score such that a higher confidence score indicates a higher likelihood that the image has the subject value at the subject level. Alternatively, the model may output a binary value, with one possible value (e.g., 1) indicating that an image likely has the subject value at the subject level and the other possible value (e.g., 0) indicating that the image likely does not have the subject value at the subject level.

The method 300 may then include adding 308 the subject value to the subject level of the image data hierarchy 104 of the images identified. For example, where the subject level is style 106 and the subject value is "Vintage," the images identified by the vintage style model as having the vintage style will have "Vintage," or a code corresponding to "Vintage," added to the style 106 level in their image data hierarchies 104.

Figure 4:
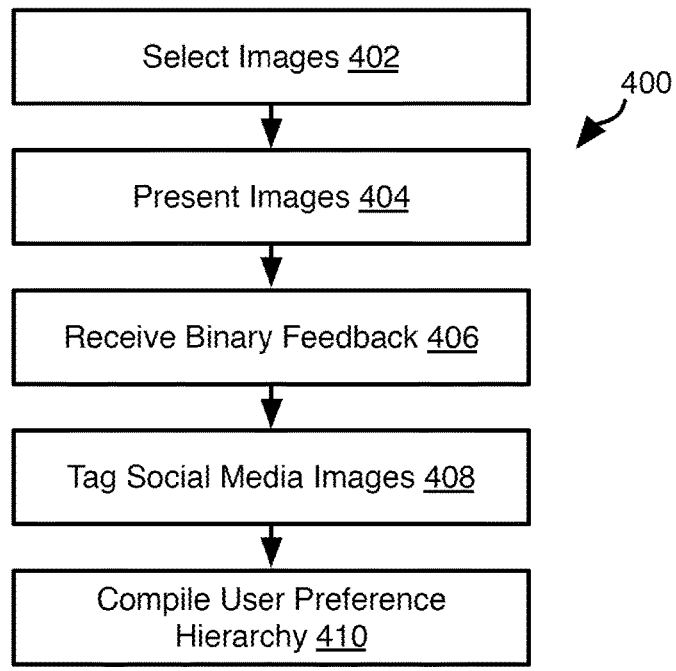
FIG. 4 is a process flow diagram of a method for generating a user preference hierarchy in accordance with an embodiment of the present invention.

FIG. 4 illustrates a method 400 for generating a user preference hierarchy 114 for a user. The method 400 may include selecting 402 a set of images for querying a user. The images may be manually tagged with an image data hierarchy 104 or be tagged using a trained model 202a-202c. The images may be selected for having diversity of values at some or all of the levels of the image data hierarchy, i.e. multiple styles, multiple types, a broad range of features.

The method 400 may further include receiving 406 feedback from a user regarding the presented images. In some instances, the feedback may be received in the form of a binary feedback that is either positive or negative, e.g., yes/no or like/dislike.

The method 400 may further include tagging 408 social media activity of the user. In particular, images posted on the social media accounts of the user may be identified. Images in websites and other social media posts referenced in the social media accounts may also be identified along with indications of user sentiment. For example, an image or content containing an image (website, posting, etc.) may be "liked," "disliked," rated (e.g., one to four stars), or otherwise associated with sentiment of the user. Images tagged 408 may include images of the user stored on a user's computer or a photo archiving site.

Images may be tagged 408 according to the method 300 whereby trained models 200a-200c generate the image data hierarchy 104 for the images. The images may be further tagged with either a positive or negative feedback. For example, images posted by the user or referenced by the user's social media activity may be assumed to be positive unless associated with a negative sentiment (e.g., "dislike", one-star rating, etc.) on the social media platform from which the image was obtained.

Using the binary feedback 406 for the presented 404 images and the tagged social media images, a user preference hierarchy may be compiled 410. For example, each style may be scored according to a function that increases with a number of occurrences in the style in the image data hierarchy 104 of images with positive feedback and decreases according to a number of occurrences of the style in the image data hierarchy 104 of images with negative feedback. The function may be a matter of summing the number of occurrences with positive feedback less the number of occurrences with negative feedback. The numbers of occurrences may be weighted prior to summing with the weights being predefined by an operator. Other functions may also be used, such as a non-linear function of the number of occurrences with positive feedback and the number of occurrences with negative feedback. The function may also be implemented as a neural network or machine learning mode.

Note that although binary feedback is advantageously used in some embodiments, other types of feedback could be used, e.g. a selection of a number of stars up to five stars for example with five stars indicating the most positive response. In other examples, feedback could be received in the form of a user positioning a slider along a line with one end indicating a completely negative response and the other end being a completely positive response. The user position of the slider along this line may be translated into a numerical value indicating the user's sentiment (positive/negative) and strength of that sentiment (i.e. strongly negative vs. mildly negative). Accordingly, the score for a style may be a function of the values assigned to images including that style, where the values are a number of stars, a number derived from user positioning of a slider, or some other value within a range of three or more values.

The style with the highest likelihood of a user liking it, such as according to the scores, or the N (e.g. a predefined value between 2 and 10) most likely to be liked styles, may be selected as the style or styles 116 to be included in the user preference hierarchy 114. For each of the one or more styles 116, selected, the each style 116 may be further refined with types 118 and features 116 of images with positive feedback and tagged with the each style 116 in the image data hierarchy 104 thereof. Accordingly, a "style" of a user may be expanded to include one or more vectors of types 118 and features 120 such that the style of the user may lie on a continuum of possible styles.

For each style 116, the types 118 and features 120 may be determined based on frequency of occurrence among images with positive feedback and tagged with the each style 116. For example, the top M types 108 with the highest scores may be selected as the types 118 for the user preference hierarchy 114, where M is a predetermined integer (e.g., between 2 and 100) and the score of a type increases with the number of images having the each style 116 and the type and have positive feedback and decreases with the number of images having the each style 116 and the type and have negative feedback.

Features 120 for a style 116 may be determined in a similar manner. For example, the top P features 110 with the highest scores may be selected as the features 120 for the user preference hierarchy 114, where P is a predetermined integer (e.g., between 2 and 100) and the score of a feature increases with the number of images having the each feature 116 and the feature and having positive feedback and decreases with the number of images having the each style 116 and the feature and have negative feedback.

The user preference hierarchy 114 as compiled at step 410 may then be used to make product recommendations to a user. As additional feedback 406 on images and/or social media images are received, the method 400 may be repeated in order to update the user preference hierarchy 114 with the new information.

Figure 5:
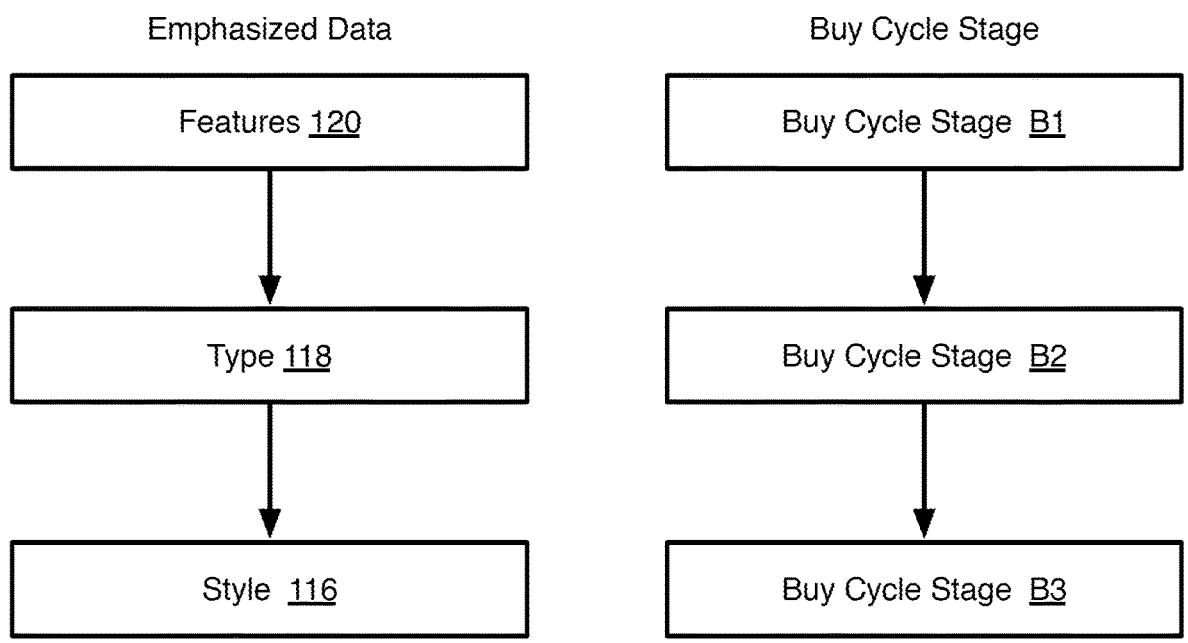
FIG. 5 is a process flow diagram of a relationship between stages of a buy cycle and a preference hierarchy in accordance with an embodiment of the present invention.

Referring to FIG. 5, a user purchase experience typically includes a plurality of stages, illustrated in FIG. 5 buy cycle stages B1 to B3. For example, a user may make initial contact with a website from a browser on a user device 126 at one stage, enter a query and receive search results at a second stage, make a selection of a listing of a product in the search results and visit a product page at a third stage, select a product from among product recommendations on the product page at a fourth stage, add a product to a cart at a fifth stage, perform additional searching at a sixth stage, purchase a product at seventh stage. Of course, this is just an example and any number of user actions may be performed to constitute any number of stages of a buy cycle.

As shown in FIG. 5, the component of the user data hierarchy 114 that is emphasized in making product recommendations may vary throughout the buy cycle such that the level of the hierarchy 114 that is emphasized moves from least subjective to most subjective. This is not to say that all of the levels of the user data hierarchy 114 are not used throughout the buy cycle. Instead, the emphasis on the levels of the user data hierarchy 114 will vary throughout the buy cycle such that the emphasis (e.g., weight) applied to matching to style 116 of the user data hierarchy will increase relative to the emphasis of the features 120 of the hierarchy 114 with increase in the stage of the buy cycle. Stated more generically, for any two levels of the user preference hierarchy, the emphasis of the level of higher subjectivity will increase relative to the level with lower subjectivity with increase in the stage of the buy cycle, e.g. passage of time.

Figure 6:
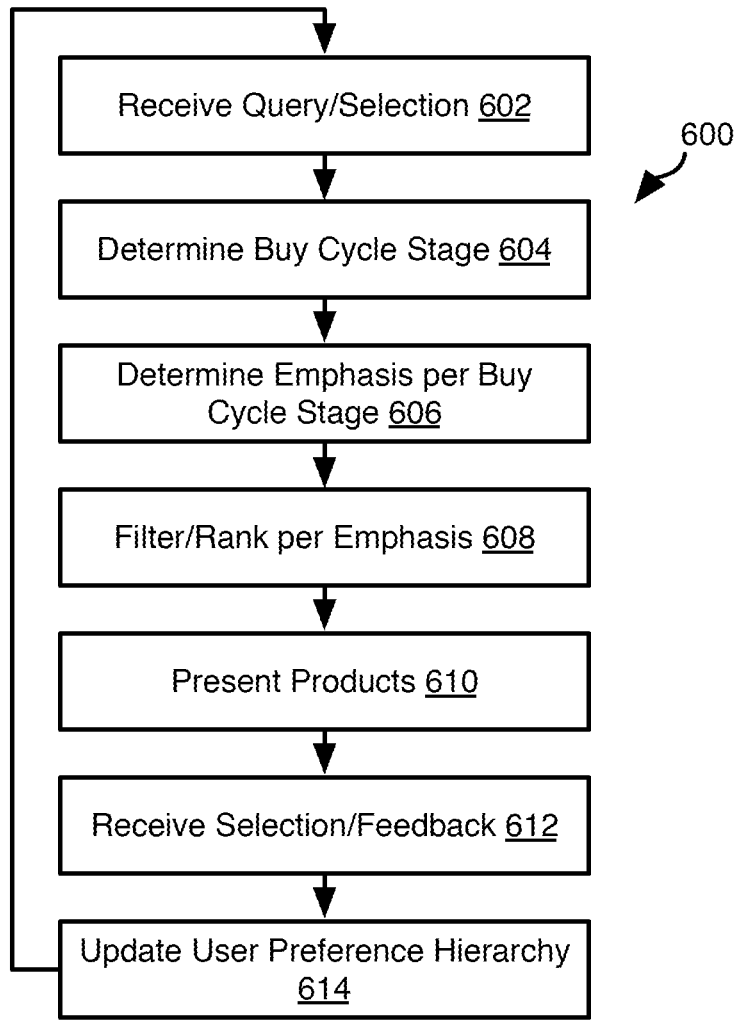
FIG. 6 is a process flow diagram of a method for providing product recommendations using a preference hierarchy in accordance with an embodiment of the present invention.

FIG. 6 illustrates an example method 600 by which product recommendations may be provided to a user using the user preference hierarchy 114. The method 600 may be executed by the server system 124 or some other computer system. For example, some of the processing of the method 600 may be performed on a user device 126. The method 600 may include receiving 602 a user interaction from a user device 126, such as entry of a query, selection of a product listing in search results, selecting a product listing in a set of product recommendations, clicking on an advertisement linked to a website, or any other interaction with a website that may be detected or reported to the server system 124.

The method 600 may include determining 604 the buy cycle stage of the user. For example, if the user interaction is a query into a search field or a referral from an advertisement or a search engine, the stage may be determined to be the first stage in a buy cycle. If the user interaction is selection of a search result following entry of a query, it may be determined to be the second stage. For example, each interaction following entry of a query or entry to a website by way of an external referral may be determined to be a next stage in the buy cycle. In some embodiments, a query that is for a same product or category of products as a preceding query may be determined to be part of the same buy cycle as the preceding query.

The method 600 may further include determining 606 an emphasis for the different levels of the user preference hierarchy 114 according to the stage determined at step 604. For example, a weight W(X, Y) may be calculated, where X is the level (a higher value indicating less subjective, e.g., style 116=level 0, type=level 1, feature=level 2) and Y is the stage in the buy cycle. As noted above, the function may be such that the weight W1 for one level X1 relative to the weight W2 for another level X2, X2>X1, will increase with increase in Y.

The method 600 may further include one or both of filtering and ranking 608 search results or product recommendations according to the emphasis. For example, in a first scenario, step 602 includes receiving a query with one or more search terms.

Accordingly, step 610 may include identifying products that correspond to the search terms. Identifying products may be performed according to any approach for determining results for a search query known in the art. Among those products identified, the image data hierarchy 104 for those products may be compared to the user preference hierarchy 114. For example, a product may be assigned a score that increases with an amount of matching between the image data hierarchy 104 of the product and the user preference hierarchy 114. For example, for each level of the hierarchy, if a match is found, the score may be increased by an amount weighted by the weight determined for that level at step 606. The amount that is weighted may be binary (1 if a match) or may increase with a number of matches at that level (e.g., number of styles, types, or features that match between the image data hierarchy 104 and the user preference hierarchy 114).

The top Q products with the highest scores may be selected as search results in this example and a listing of those products may be presented to the user. In other embodiments, products with scores below a threshold may be filtered out and the remainder presented as search results. The listing of search results may be ordered according to the scores with the highest score first.

In another example, the user selects a search result or a representation of a product in a product recommendation at step 602. Accordingly, steps 604-610 may be executed to select product recommendations to present on the product page corresponding to the selected product. In that case, the initial set of matching products may be those belonging to the same brand, same category of products, or having some other relationship to the selected product. This set of matching products may then be filtered and/or ranked according to step 608.

The results or products identified according to steps 604-608 may be presented 610 to the user, such as in the form of search results transmitted to the user device 126 or in the form of product recommendations displayed on a product page or other webpage presented on the user device 126.

The method 600 may further include receiving 612 information regarding user interaction with the products presented at step 610. This may include detecting failure to select a product among the listing of products presented at step 610 or detecting selection of a product in a product listing presented at step 610. For example, 612 may include detecting whether the user device 126 transmits a request for a product page linked to by an entry in the product listing presented at step 610. As noted above, a user may provide binary feedback regarding images. For example, the listing presented at step 610 may include user interface elements enabling a user to input binary feedback and returning this feedback to the server system 124. Accordingly, step 612 may include receiving binary feedback for a product presented at step 610.

The method 600 may then include updating 614 the user preference hierarchy according to the selections or feedback received at step 612. This may include performing the method 400 of FIG. 4 with the feedback of step 612 as the binary feedback received at step 406. In particular, the feedback of step 612 may be combined with previous feedback received at previous iterations of the method 400 in order to compile 410 a new user preference hierarchy. In some embodiments, more recent feedback will be given greater weight when compiling 410 the new user preference hierarchy.

Figure 7:
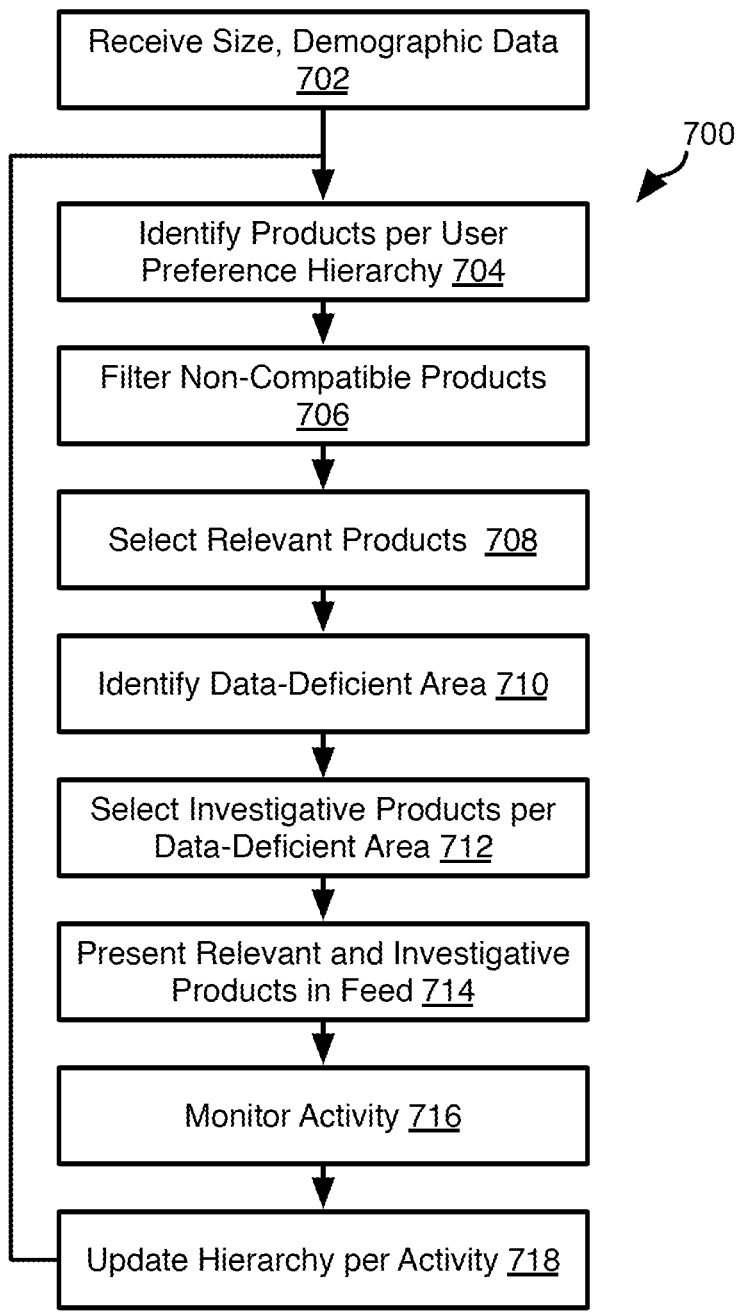
FIG. 7 is a process flow diagram of a method for providing a user-specific storefront in accordance with an embodiment of the present invention.

Referring to FIG. 7, the illustrated method 700 may be executed by a server system 124 in order to present a personalized storefront to a user on a user device 126. The method 700 may be preceded by generating the user preference profile according to the method 400.

The method 700 may include receiving 702 additional information regarding a user such as sizes, gender, price range, and the like. These may be received by querying the user by way of the user device 126 or may be inferred based on previous purchases.

The method 700 may include identifying 704 a set of products that has a high probability of matching the user's tastes using the user's data preference hierarchy 114. This may be performed in the manner described above with respect to step 608 of the method 600. In particular, step 704 may include identifying products that have a style 106 matching one or more styles 116 of user's data preference hierarchy. These products may be assigned a score according to correspondence with the types 118 and features 120 of the user preference hierarchy 114. For example, a score for a product may be a sum, or weighted sum, of the number of types 108 of the product that match the types 118 of the user preference hierarchy 114 and the number of features 110 of the product that match the features 120 of the user preference hierarchy. Of course, this is just one example of a scoring algorithm.

The top R, where R is a predefined integer, products with the highest scores may be selected at step 704 as the identified products. These products may be filtered 706 according to the data received at step 706 to filter non compatible products, e.g. not the right size not corresponding to the user's gender. Note that steps 704 and 706 may be reversed in some embodiments: only compatible products are evaluated with respect to the user preference hierarchy 114. The value of R may be dynamic. For example, if there are a total of 100,000 products in all, a minimum set may be defined that provides an improved amount of information. This minimum set could be determine using a clustering algorithm such as k-means or Acoustically Motivated Clustering (AMC) or a machine learning algorithm such as a deep learning or neural network approach.

The method 700 may include selecting 708 relevant products from the products remaining after steps 704 and 706. The selection of step 708 may include selecting products based on scores as described above with respect to step 704. Step 708 may additionally consider other criteria such as whether a product has already been displayed to a user, how long since a product was last displayed to a user, whether a user has purchased a product, whether a product is an accessory to or goes will with a product purchased by a user, or any other criteria.

The method 700 may further include identifying 710 a data-deficient area. A data-deficient area may be a feature, type, or style for which an opinion of the user has not been received. In particular, a data-deficient area may be a feature, type, or style for which the user has not expressed a clear positive or negative opinion by way of feedback on images or images from the user's social media information. This may include values for the style, type, or feature that are not represented in images evaluated by the user or received from the user. A data-deficient area may be a value for a style, type, or feature that is represented in images with both positive and negative feedback. For example, user may like an image of style A and including feature B and dislike an image of style C and including feature B. Accordingly, it may not be apparent whether or not the user actually likes feature B. Feature B would therefore be a data deficient area in this example.

The method 700 may further include 712 selecting one or more "investigative products" according to the data deficient areas. Accordingly, where feature B is a data deficient area, investigative products may be products that match a style and having types identified as favored by a user and also having feature B. Accordingly, user reaction to images of the investigative products will indicate whether feature B is of interest to the user. Likewise, where a data-deficient are is a style or a type, products with images having that style or type in their image data hierarchy may be selected for presentation at step 712.

The method 700 may then include presenting 714 the relevant products selected at step 708 along with the investigative products selected at step 712 to the user. This may include generating a feed of product listings that is transmitted to the user device 126 in the form of a webpage or other type of interface. Images in the listing may be links to product pages corresponding to the images. Images in the listing may have a user interface element superimposed therein or positioned adjacent thereto that enable user to input binary feedback that is transmitted back to the server system 124. In this manner, the user may indicate to the server system 124 whether the user likes or dislikes a product represented in an image. User interactions with these interface elements and other interaction with the images (ignoring, selecting to visit product pages, purchasing, liking, disliking) may be monitored 716 and the user preference hierarchy may then be updated 718. This may include executing the method 400 of FIG. 4 with the images and additional feedback received for them as detected during the monitoring step 716.

Product images that are ignored may be assumed to be disliked or may be assigned a weight intermediate to the weights for images that are liked or disliked. In particular, for a particular style, type, or feature ("element"), a score for that element may be a sum of weighted number of images including that element that are liked, a negative weighted number of images including that element that are ignored, and a negative weighted number of images including that element that were disliked. The weighting applied to the number of ignored images may be less than a weighting applied to the number of disliked images. Styles, types, and features may then be added to the user preference hierarchy according to the scores as described above with respect to the method 400 of FIG. 4.

The method 700 may repeat from step 704 such that products are selected and filtered using the updated user preference hierarchy 114. Note that the feed may be updated in real time: disliked product images may be removed and replaced with new images selected according to the method 700. Ignored images may be removed following a timeout period and replaced with other images according to the method 700. In response to liking, purchasing, or other interaction with an image, new images may be added to the product feed that correspond to that image (matching in at least one of style, type, and features).

As noted above, product images may be presented in a feed such that newer-presented images are located closer to the top than images that were presented earlier. The feed may be scrollable as known in the art of feeds such as might be used in a social media context.

Figure 8:
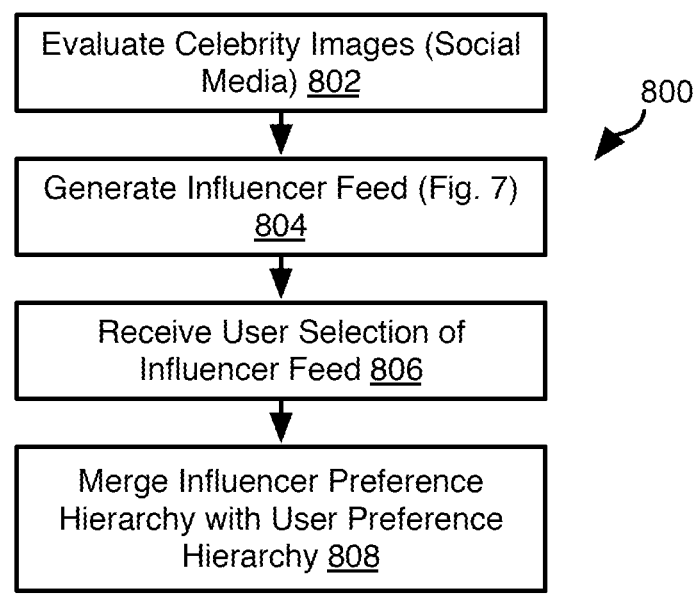
FIG. 8 is a process flow diagram of a method for incorporating a product feed of an influencer in accordance with an embodiment of the present invention.

Referring to FIG. 8, the methods described herein may be applied to a celebrity or other fashion influencer, hereinafter "influencer," and other users may incorporate the user preference hierarchy 114 of a celebrity.

For example, a method 800 may include evaluating 802 images of the influencer, which may include images in media (news and fashion websites, magazines etc.) as well as images in one or more social media feeds of the celebrity in order to generate a user preference hierarchy 114 for the influencer. This may include executing the method 400 of FIG. 4. The method 800 may further include generating 804 an influencer feed for the influencer, such as according to the method 700 of FIG. 7.

Steps 802 and 804 may be executed for a plurality of influencers. The server system may provide an interface for users to view names and images of influencers and select the feeds of one or more influencers.

The method 800 may further include receiving 806, from a user computing device 126, a selection of a feed of one or more influencers. In response, the method 800 may include merging 808 the user preference hierarchy 114 of the influencer with the user preference hierarchy 114 of the user. This may include using multiple hierarchies 114 to select products according to the method 700. For example, a certain portion (e.g. 10 percent) of products may be selected according to the influencer hierarchy 114 with the remainder being selected according to the user hierarchy 114.

In some embodiments, merging may include creating a single user preference hierarchy 114 that includes the styles 116 of the influencer along with lower levels (types 118 and features 120) to the user preference hierarchy 114 of the user. This updated user preference hierarchy 114 may then be used to select products for the user's feed according to the method 700.

The user may select multiple influencers all of which may be merged 808 according to either of the above-described approaches.

Figure 9:
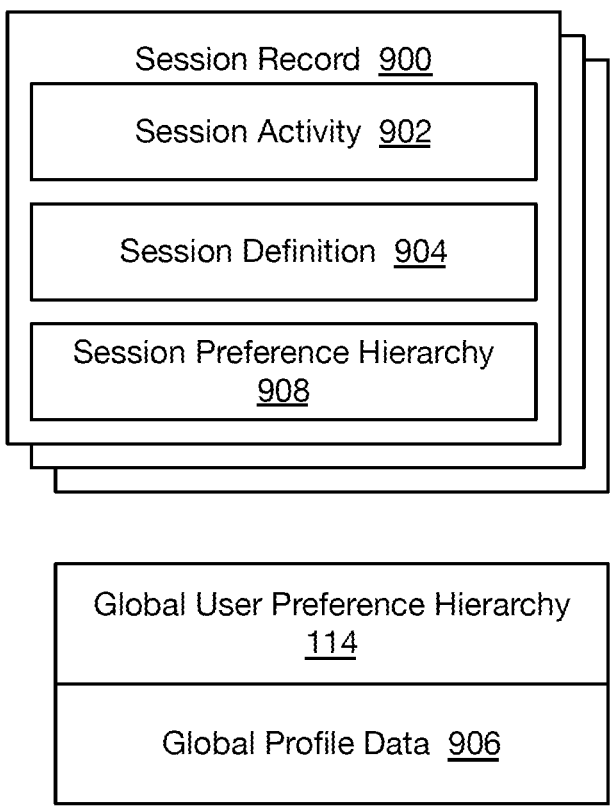
FIG. 9 is a schematic block diagram of data and modules used to provide session-based product recommendations in accordance with an embodiment of the present invention.

Referring to FIG. 9, in some embodiments, product recommendations for a user may be provided based on session data. In particular, user activity at different points in time and in different browsing sessions separated by hours or even days or weeks may be associated to the same session and recommendations may be provided primarily based on a session profile rather than the user preference hierarchy 114 of the user.

To that end session records 900 may be maintained for each session identified for the user. The session record 900 for a session may include session activity 902. This may include some or all of, search query strings, selection of search results, product pages visited, products added to a cart, products purchased, or the like. The session activity 902 may include negative data, e.g. search results not selected, product recommendations that were not clicked on, products that were added to a cart but not purchased, or other actions not taken by the user that may be helpful to determine the user's preferences. As noted previously, session activity 902 may include activity from different browser session of a user with a website separated by periods of inactivity with respect to the website.

The session record 900 may further include a session definition 904. The session definition 904 may be data that facilitates a determination of whether user activity corresponds to the session represented by the session record 900. For example, products of a retailer may be represented in a hierarchical taxonomy such that each node is a product or product category and any children of a node that is a product category are either a product or child category (e.g., subcategory) belonging to that product category. Accordingly, the session definition 904 may be an identifier of a node of the product taxonomy that includes products having positive interactions, such as one or more of:

entering a query relating to the node or a child product or child category of the node selecting a search result referencing a product that is a child of the node;

clicking on a recommendation for a product that is a child of the node;

providing positive feedback on an image for a product that is a child of the node adding a reference to a product that is a child node of the node to the user's electronic cart; and purchasing a product that is a child node of the node.

For example, for a browser session, the most specific node (furthest from the top node of the taxonomy hierarchy) that encompasses all of the nodes having positive interaction during the browser session may be selected as the node referenced in the session definition 904.

In another example, a parent may search for clothing or other products for a child. Accordingly, the session definition 904 may include an age suitability, size range, age classification as being a product for children, or other data corresponding to products having positive interactions (see above) during a browser session. In particular, data for products having positive interactions that are inconsistent with other data in the user's profile may be used in the session definition 904, e.g., an age suitability, size range, or age classification that does not match the user's age or sizes included in global profile data 906 storing profile data (age, gender, location, sizes, etc.) for the user that is stored for the user in addition to the user preference hierarchy 114. The user preference hierarchy 114 and global profile data 906 may be understood to be a global profile of the user.

The session record 900 may further include a session preference hierarchy 908. As discussed above, images may have an image data hierarchy 104. Images in a browser session with which a user has positive interactions (see above) or for which the user has had a positive interaction for product corresponding to an image data hierarchy 104 may be identified. The image data hierarchies 104 of these images may be compiled to generate a session preference hierarchy 908 indicating preferences of the user for the levels (style, type, feature) according to the actions of the user during the browser session. The manner in which the session preference hierarchy 908 is compiled may be the manner in which the user preference hierarchy 114 is compiled as described above with respect to step 410 of FIG. 4 except that only actions of the user with respect to products and product images during browser sessions corresponding to the session definition 904 are considered.

The manner in which the session record 900 for a session is used to generate session-based product recommendations is described in greater detail below with respect to FIGS. 10 and 11.

Figure 10:
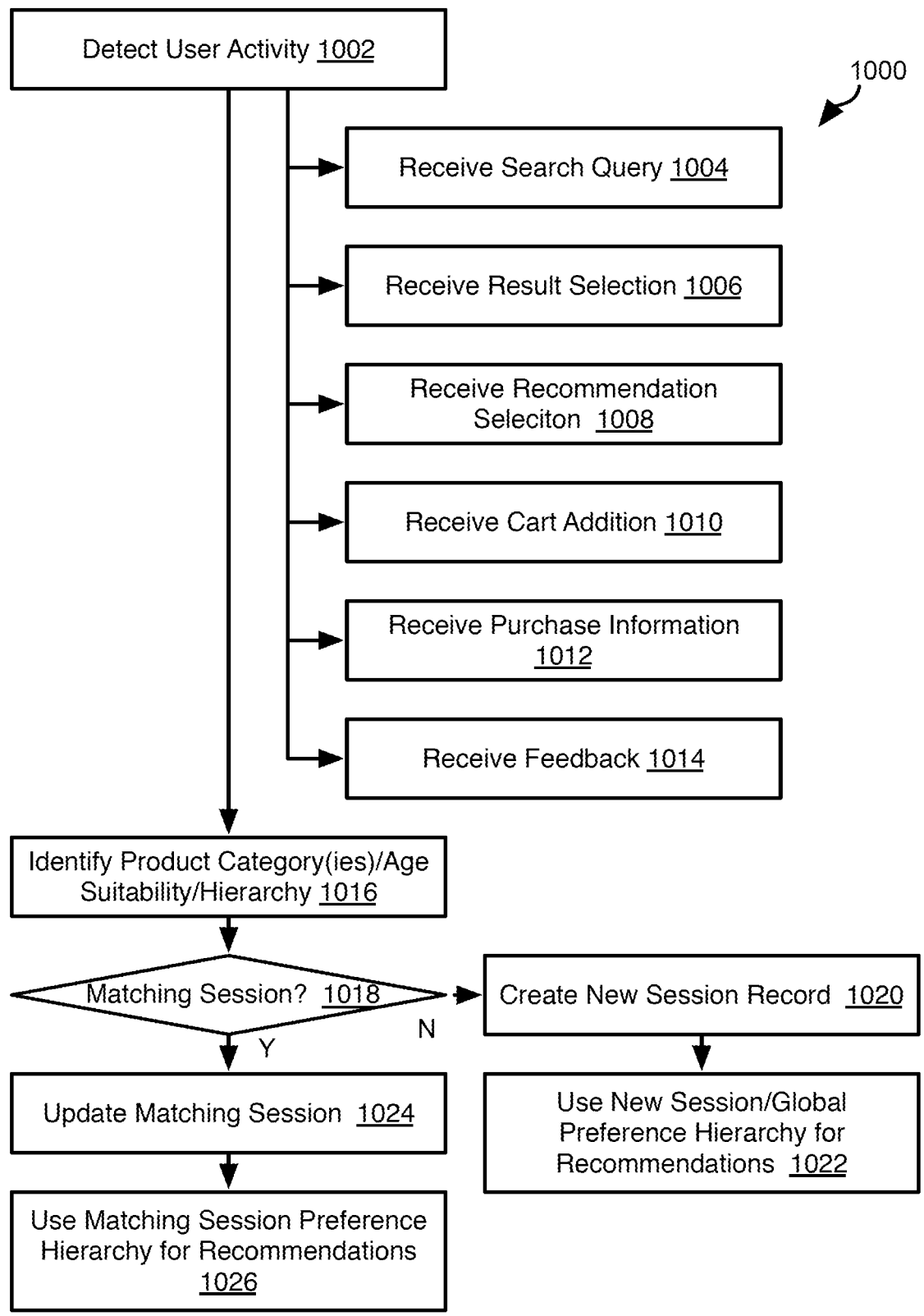
FIG. 10 is a process flow diagram of a method for associating user activities with a previously-created session in accordance with an embodiment of the present invention.

Referring to FIG. 10, the server system 124 may perform the illustrated method 1000 based on interaction with one or more user devices 126 associated with the user (referred to hereinafter only in the singular as "the user device 126").

The method 1000 may include detecting 1002 user activity. The detected user activity may include activity taken by the user while logged into an account of the user or otherwise mapped to the user by means of cookies or other identification means.

The detected user activities may be received from the user device 126 include such things as receiving 1004 a search query including a search string, receiving 1006 selection of a product included in search results presented on the user device 126, receiving 1008 selection of a listing for a product from a listing of product recommendations presented to the user on the user device 126, receiving 1010 addition of a reference to a product to an electronic shopping cart of the user, receiving 1012 information indicating purchase of a product by the user, and receiving 1014 binary feedback on a product image presented to the user according to the methods disclosed hereinabove.

Note that step 1002 may be performed throughout a browser session, e.g. a time period from which a user first visits a webpage of a retailer with a browser until the user browses away from the website of the retailer to a site that is not associated with the retailer or closes the browser. However, the remaining steps of the method 1000 may be performed prior to completion of the browser session, such as once a sufficient number of activities have been received to assess whether the activities correspond to an existing session record 900. For example, 1, 2, 3, or some other predefined number of the activities of steps 1004-1014.

The method 1000 may include identifying 1016 product categories (including sub-categories) to which products identified from the activities of 1002 belong. Step 1016 may further include identifying size ranges, age suitability, or classification (for toddlers, children, for teenagers, for adults, etc.) of the products referenced in the activities detected at step 1002. In some embodiments, step 1016 may include evaluating image data hierarchies 104 of products identified in the activities detected at step 1002. This may include compiling them into a preference hierarchy corresponding to the activities ("activity hierarchy"), such as according to the approach described above with respect to step 410 of FIG. 4 except that only the activities detected at step 1002 are evaluated.

The method 1000 may then include evaluating 1018 whether the information identified at step 1016 matches an existing session record 200. This may include evaluating whether the product category (e.g., node in the taxonomy hierarchy) is the same as, or a descendent of, the node referenced in the session definition 904 of a session record.

Step 1018 may include evaluating whether a size range, age suitability, or age group classification identified at step 1016 matches the size range, age suitability, or age group classification included in the session definition 904 of a session record 200.

Step 1018 may include evaluating whether the activity hierarchy from step 1016 matches the session preference hierarchy 908, for example whether the style 116, types 118, or features 120 of the activity hierarchy match the style 116, types 118, and features of the session preference hierarchy 908. For example, a similarity score may be calculated such that the score increases with the number of values in the activity hierarchy at each level 116, 118, 120 that match values in the corresponding level 116, 118, 120 of the session preference hierarchy, with the increase for each level according to the number of matching values being weighted the same or differently among the levels.

If some or all of the comparisons (product category, age suitability/size/age classification, and activity hierarchy) are found to match a session record 900 at step 1018, the activity detected at step 1002 may be determined to correspond to that session record 900. If not, the method 1000 may include creating 1020 a new session record 900. The method 1000 may further include using the new session record 900 and the global user preference hierarchy 114 and global profile data 906 for product recommendations rather than using a session record 900 that existed prior to executing the method 1000. The manner in which product recommendations are generated at step 1022 may be according to any of the approaches described above with respect to FIGS. 1 through 8.

If a matching session record 900 is found 1018, the method 1000 may include updating 1024 the session record 900 according to the activity detected at step 1002. In particular, the activity from step 1002 may be added to the session activity 902. In some embodiments, step 1024 may include updating the session preference hierarchy according to the image data hierarchies 104 for products referenced in the activities detected at step 1002 (see, e.g. step 614 of FIG. 6 and step 718 of FIG. 7 for examples of how an existing preference hierarchy may be updated for newly detected activity).

The method 1000 may further include using 1026 the matching session record 900 to make product recommendations. An example of how step 1026 may be performed is described below with respect to FIG. 11.

Note that the method 1000 may be repeated during a single browser session. In particular, if new user activity is detected 1002 and found 1018 to not match the session identified at a previous iteration of step 1018, then processing may continue from step 1018 with respect to the new user activity in order to identify another matching session record 900 or to create a new session record 900.

Figure 11:
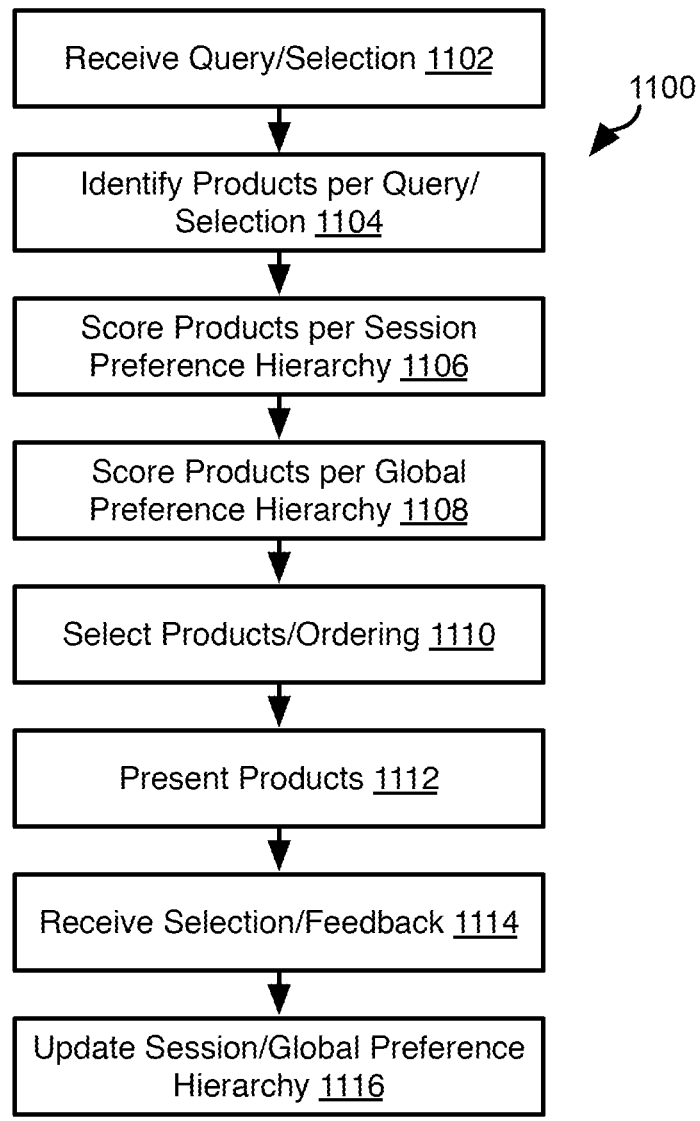
FIG. 11 is a process flow diagram of a method for providing session-based product recommendations in accordance with an embodiment of the present invention.

FIG. 11 illustrates a method 1100 for generating product recommendations using a session record. The method 1100 may be executed by the server system 124 interacting with the user device 126.

The method 1100 may include receiving 1102, from the user device 126, a query string or selection of a product listing in search results, an advertisement, or other context. The method 1100 may include identifying 1104 products according to the query or selection from step 1102.

In one example, a search query is received and identifying 1104 products may be performed according to any approach for determining results for a search query known in the art.

In another example, the user selects a search result or a representation of a product in a product recommendation at step 1102. In that case, the identified products may be those belonging to the same brand, same category of products, or having some other relationship to the selected search result or representation of a product.

In either example, the products identified may be filtered according to known user attributes (size, gender, etc.) as recorded in the global profile data 906 such that only products that are possibly compatible with the user according to the global profile data 906 are considered in subsequent steps of the method 1100.

The method 1100 may include scoring 1106 the identified products from step 1104 according to similarity to the session preference hierarchy 908. For example, the image data hierarchy 104 for the identified products may each be compared to the session preference hierarchy 908. For example, a product may be assigned a score that increases with an amount of matching between the image data hierarchy 104 of the product and the session preference hierarchy 908. For example, for each level of the hierarchy, if a match is found, the score may be increased by an amount weighted by a predefined weight associated with that level (or a weight determined according to stage in the buy cycle as described above with respect to FIG. 6). The amount that is weighted may be binary (1 if a match) or may increase with a number of matches at that level (e.g., number of styles, types, or features that match between the image data hierarchy 104 and the session preference hierarchy 908).

The method 1100 may further include scoring the identified products according to similarity to the global user preference hierarchy 114. This may include assigning a score in the same manner as described above with respect to the session preference hierarchy 908 except that the global user preference hierarchy 114 is used in place of the session preference hierarchy 908.

The result of steps 1106 and 1108 is a session score (step 1106) and a global score (step 1108) for some or all of the products identified at step 1104. These scores may be combined to obtain a total score. In particular, these scores may be combined such that the session score is given much greater weight than the global score, e.g. $S_t = W_s * S_s + W_g * S_g$, where $S_t$ is the total score, $W_s$ is the weight for the session score $S_s$, and $W_g$ is the weight for the global score $S_g$. Accordingly, $W_s$ may be much greater than $W_g$, e.g. at least two times greater, preferably at least four times greater, and more preferably at least 16 times greater. In some embodiments, where there is a matching session record 900, the global user preference hierarchy 114 is ignored such that the total score $S_t$ is simply $S_s$. Note that the combination of $S_s$ and $S_t$ may be non-linear. For example, some or all of the inputs used to derive $S_s$ and $S_t$ as described above may be input to a machine learning model that that scores a product. The machine learning model may have been trained to output a score based on these inputs, the score indicating a likelihood of user interest in a product. Note that inputs as input to the machine learning model or in the calculation of $S_s$ and $S_t$ may further be weighted by recency such that more recently received data is given greater weight than earlier received data.

The method 1100 may include selecting 1110 products according to the scores, e.g. the products with the top N highest scores may be selected, where N is a predetermined number, e.g. an integer from 2 to 10. The selected products may be ordered, such as from highest score to lowest. In some embodiments, infinite scrolling may be implemented such products are presented to the user from highest scoring to lowest scoring as the user scrolls through the results until there are no products remaining to be displayed The products as selected and ordered at step 1110 may be presented 1112 to the user, such as by transmitting representations (images, text, etc.) of the selected products to the user device 126 for rendering in a browser executing on the user device 126.

The method 1100 may further include receiving 1114 selections of one or more products from those presented at step 1112 from the user device and/or receiving 1114 feedback (e.g., binary feedback) for the one or more products presented at step 1112. The method 1100 may further include updating 1116 the session preference hierarchy 908 and/or the global user preference hierarchy according to any selection or feedback received at step 1114. This may be performed in the same manner as for steps 612 and 614 of the method 600.

Figure 12:
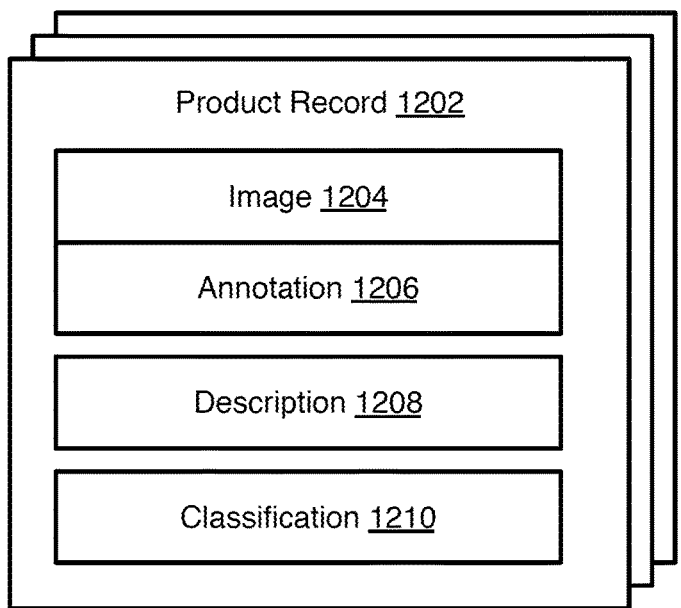
FIG. 12 is a schematic block diagram of a system for classifying product data in accordance with an embodiment of the present invention.
Figure 12:
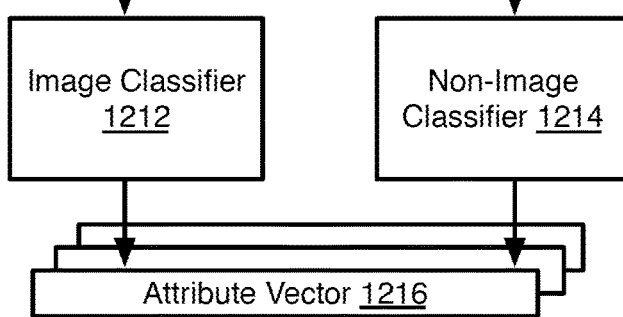
Figure 12:
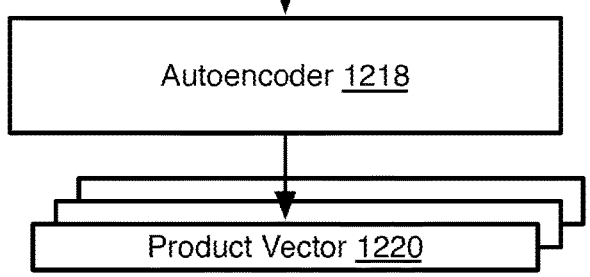

Referring to FIG. 12, the illustrated system 1200 may be implemented by the server system 124 in addition to or in place of the systems and methods of FIGS. 1 through 11. The system 1200 may take as inputs product records 1202, each describing a particular product. The product record may include one or more images 1204 of the product. The system and methods disclosed herein are particularly advantageous for making product recommendations for wearable items. Accordingly, the images 1204 may include an image of the product alone, an image of the product being worn by a model, or other images. Each image 1204 may include an annotation 1206 that describes one or more aspects of the image, such as the product shown, whether it is worn by a model, or the like.

A product record 1202 may further include a product description 1208 that may include structured data (attribute name and value pairs) or unstructured data (prose product description for reading by a customer). The product record 1202 may further include a classification 1210 of the product, such as a path in a product taxonomy (category, sub-category, sub-sub-category, etc.) of the product.

The product records 1202 may be processed by an image classifier 1212 and a non-image (e.g., text, non-image numerical codes) classifier 1214. A result of analyzing a product record 1202 using the classifiers 1212, 1214 may be an attribute vector 1216. Each element of the attribute vector 1216 is a binary, integer, or floating point value (preferably a floating point value) indicating a probability that the product record 1202 is for a product having an attribute corresponding to that element. In particular, each element may be mapped to a particular attribute such as a color, feature, type, style, or other attribute. In particular, for a finite set of colors, each color of that set may have a corresponding element position in the attribute vector 1216 that will have a nonzero value when the classifiers 1212, 124 determine that that color is indicated in the image 1204 or text data of a product record 1202. Similarly, there may be a finite set of types, a finite set of features, a finite set of styles such that each feature, type, and style of these sets is mapped to an element position in the attribute vector 1216 and which will be nonzero when the classifiers 1212, 1214 determine that the product record 1202 has the feature, type, or style mapped to that element position.

The classifiers 1212, 1214 may be implemented using any machine learning or artificial intelligence classification approach known in the art. For example, for each element position of the attribute vector 1216, one or both of an image classifier and text classifier may be trained to identify whether a product record 1202 for a product has the feature, type, or style mapped to that element position. For example, for an element position there may be both an image classifier and a text classifier trained to identify the feature, type, or style mapped to that element position based on image and non-image data, respectively, of the product record 1202. The outputs of these two classifiers may then be combined (summed, weighted and summed, highest of the two values) and the combination used as the value at that element position in the attribute vector 1216 for that product record 1202. Note that an image classifier may also take text as an input, such as the annotations 1206 or other data 1208, 1210 of a product record 1202.

A single image or non-image based classifier may output values for multiple element positions of the attribute vector 1216. For example, there may be a color image classifier that will produce outputs for each color in a set of colors, with each output indicating a probability that a color corresponding to that output is present in the image being classified.

The image and non-image classifiers may be trained using any approach known in the art. In particular, training data entries including an input (image or non-image data from a product record) and an output (whether an attribute (feature, type, or style) the classifier is being trained to identify is indicated by the product record). The classifier is then trained to output a value indicating a probability that the attribute is present in a given input. The manner in which this training is performed may be according to any approach to machine learning or artificial intelligence known in the art, such as a deep neural network (DNN) or other type of artificial intelligence algorithm.

The attribute vectors 1216 for a plurality of product records 1202 (preferably many thousands or tens of thousands) may then be processed by an autoencoder 1218. As known in the art, an autoencoder is a type of artificial neural network used to learn efficient data codings in an unsupervised manner. The aim of an autoencoder is to learn a representation (encoding) for a set of data, typically for dimensionality reduction. The autoencoder 1218 may be implemented according to any approach for implementing autoencoders known in the art.

The output of the autoencoder 1218 are product vectors 1220, each corresponding to a product record 1202. For example, the product vector 1220 of a product record 1202 may be stored as part of the product record or otherwise mapped to an identifier of the product record.

Figure 13:
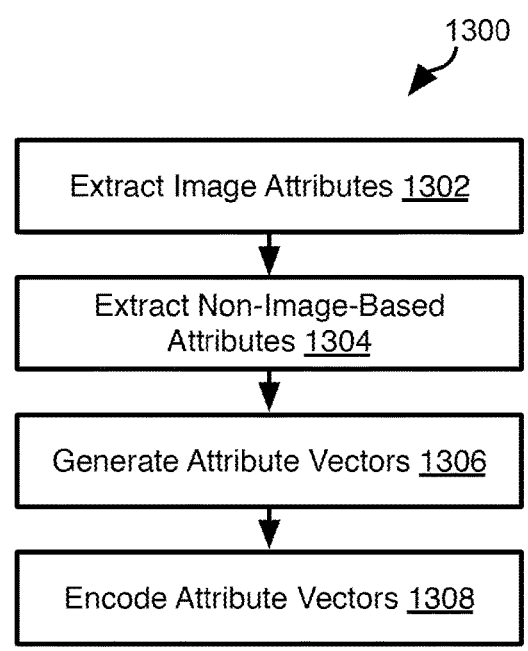
FIG. 13 is a process flow diagram of a method for classifying product data in accordance with an embodiment of the present invention.

Referring to FIG. 13, the illustrated method 1300 may be executed using the system 1200. In particular, the method 1300 may include extracting 1302 image attributes using the image classifier 1212 and extracting 1304 non-image-based attributes using the non-image classifier 1214. As noted above, each classifier 1212, 1214 may be a set of classifiers, each classifier being trained to identify one or more features, types, or styles. The attributes identified in steps 1302 and 1304 are used to generate 1306 attribute vectors 1216 for each product record 1202 processed. The attribute vectors 1216 are then encoded 1308 by an autoencoder 1218 as described above in order to generate product vectors 1220 that each correspond to a product record 1202.

Figure 14:
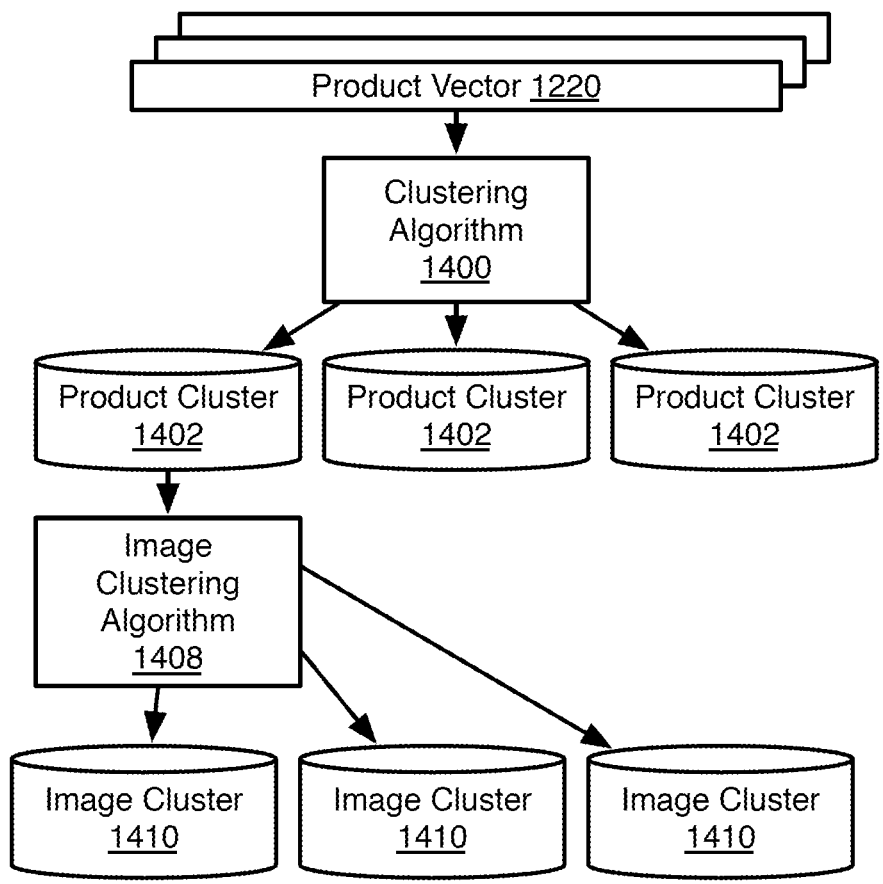
FIG. 14 is a schematic block diagram of a system for clustering products and product images in accordance with an embodiment of the present invention.

Referring to FIG. 14, product vectors 1220 may be processed by the server system 124 using the illustrated components preparatory to soliciting feedback from a user in order to determine the preferences of the user.

In particular, the product vectors 1220 may be processed by a clustering algorithm 1400 that groups the products vectors 1220 into a plurality of clusters 1402 based on similarity. Any clustering algorithm known in the art may be used and any number of clusters may be generated. For example, the clustering algorithm 1400 may include any of the following non-exhaustive list:

K-Means Clustering
Mean-Shift Clustering
Density-Based Spatial Clustering of Applications with Noise (DBSCAN)
Expectation-Maximization (EM) Clustering using Gaussian Mixture Models (GMM)
Agglomerative Hierarchical Clustering The result of the algorithm 1400 is a set of product clusters 1402. Each of these product clusters 1402 may be further processed by an image clustering algorithm 1408. As will be discussed below, groups of images 1204 for product records 1202 in the same cluster 1402 may be presented to a user in order to determine the user's affinity (positive or negative) to that cluster 1402. In order to avoid distracting the user with differences among the images that are not related to the commonality of the products shown (e.g., belonging to the same cluster), the images 1204 of the product records in a cluster 1402 may be further divided into clusters based on composition of the images.

Note that the features of the images used for clustering by the algorithm 1408 may be different from the visible features represented in the attribute vector 1216 and which the image classifier 1212 is trained to identify. Some, such as color may be the same whereas others refer more generally to a style, composition, or other aspect of the image as an image, as opposed to the products illustrated in the image. For example, whether the product is shown alone or being worn by a model. Whether the image is taken outdoors in a city, outdoors in a natural surrounding (wooded, desert, ocean view, etc.), indoors against a plain backdrop, indoors with household or office items visible in the picture, or the like. In some embodiments, images may be classified according to features of the model wearing the product in order to facilitate selection of images having features matching the user evaluating the images. Images composition may include a classification of colors present in the image, e.g. predominant background color.

The image clustering algorithm 1408 may be any clustering algorithm known in the art. The image clustering algorithm 1408 may be preceded by an annotation step in which image attribute vectors are populated with values indicating the composition of the image, such as any of the composition attributes described in the preceding paragraph. The annotation step may be performed by machine learning classifiers trained to identify the composition attributes, such as according to the approach described above with respect to the classifiers 1212, 1214 of FIG. 12. In particular, a composition attribute vector may include elements that each correspond to a composition attribute such with the value of that element indicating a probability that an image has that composition attribute as determined by a classifier for that composition attribute.

The clustering algorithm 1408 may then cluster the images according to similarity of these composition attribute vectors, such as using any clustering algorithm known in the art, such as those enumerated hereinabove.

In view of the foregoing, the server system 124 may execute the illustrated method 1500, including clustering 1502 product records 1202 according to the product records into product clusters 1402. Each cluster may then be processed 1504 by annotating 1506 images of product records 1202 with composition attribute vectors as described above. The images of each cluster may then be clustered 1508 into image clusters 1410 according to composition, such as according to the composition attribute vectors.

Figure 16:
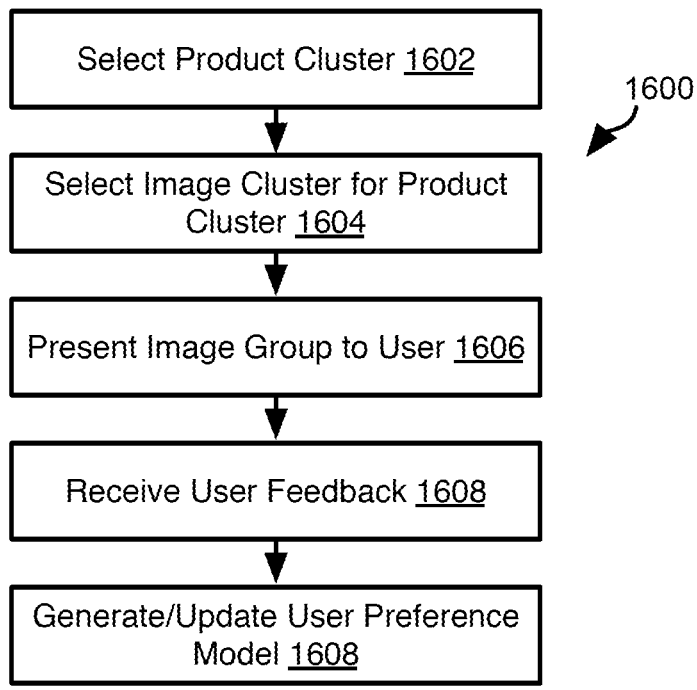
FIG. 16 is a process flow diagram of a method for generating a user preference model in accordance with an embodiment of the present invention.

FIG. 16 illustrates a method 1600 that may be executed by the server system 124 to generate a user preference model for a user according to the product cluster 1402 and image clusters 1410.

The method 1600 may include selecting 1602 a product cluster 1402. The product cluster may be selected at random, as being unrepresented in previous iterations of the method 1600, or some other approach. An example method for selecting a product cluster 1402 is described below with respect to FIG. 18.

The method 1600 may further include selecting an image cluster 1410 of the product cluster 1402 selected at step 1604. The image cluster 1410 may be selected at random, as being different from a previously selected image cluster 1410, as depicting a model having features similar to a set of known features of the user, or some other criteria.

A group of images from that image cluster 1410 may then be presented 1606 to the user. Presenting the images may include presenting the interface shown in FIG. 17. The group of images may include two, three, four, or other number of images. The interface of FIG. 17 may be presented in a feed of a user in an application on a mobile phone or a website. The interface of FIG. 17 may be presented on a product page of the user while shopping. The interface of FIG. 17 may be presented along with search results presented to the user. The interface of FIG. 17 may be presented in any other context, including a standalone context in which the user is simply providing feedback for use according to the methods disclosed herein. The interface of FIG. 17 may be presented 1606 on the device 126 of the user, such as by transmitting instructions to render the interface from the server system 124 to the device 126.

Figure 17:
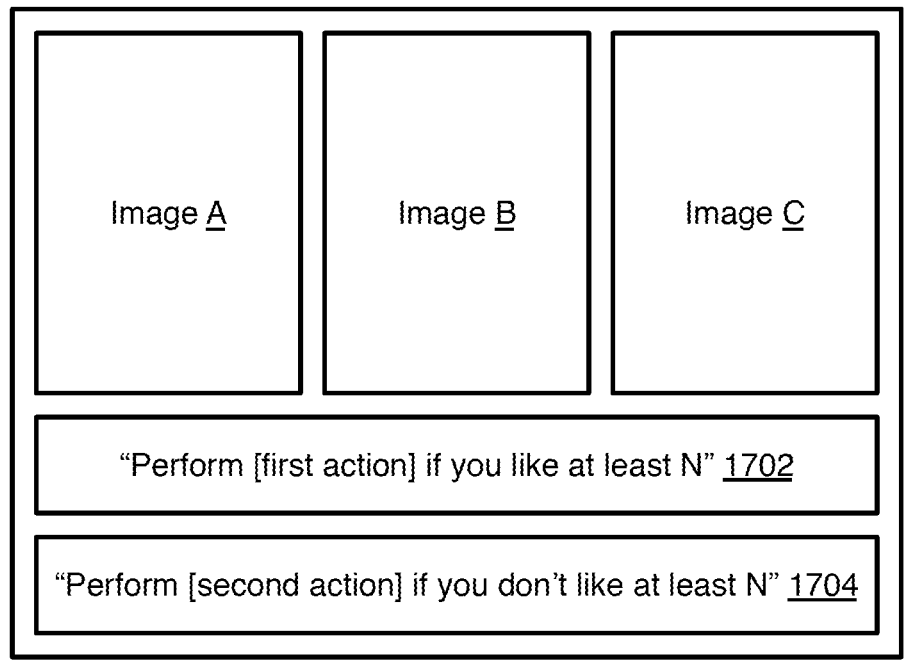
FIG. 17 is a schematic diagram of an interface for receiving user feedback in accordance with an embodiment of the present invention.

As shown in FIG. 17, the interface may include the images (A, B, C) selected at step 1604. The interface may further include one or more user interface elements 1702, 1704 for receiving positive or negative feedback regarding the images A, B, C. For example, a first element 1702 may communicate "Perform [first action] if you like at least N" of the images, where First Action is clicking a "like" button, swiping to the right, or interacting with another interface element. N may be a number that is preferably greater than half of the number of images shown, e.g. 3 if the number of images is 4, 2 if the number of images is 3, or some other number. A second element 1702 may communicate "Perform [second action] if you don't like at least N" of the images. The second action may be swiping left, selecting a dislike or cancel (e.g., "X") button, or performing some other action with respect to the interface of FIG. 17.

The method 1600 may further include receiving 1608 user feedback regarding the images presented. In particular, this may include determining whether the first action or the second action is performed. Note that in some embodiments, the second action may include failure to perform the first action, e.g. ignoring the images presented at step 1606.

The method 1600 may include repeating steps 1602-1608 a plurality of times, such as tens or hundreds of times. Once a predetermined minimum number of iterations have occurred, the method 1600 may include generating 1608 or updating a user preference model. In particular, the user preference model is trained to output, for a given product vector 1220, a value indicating whether the user will like the product represented by the product vector. Accordingly, training data entries include a product vector as an input and user feedback on images of the product corresponding to that product vector as the output. Feedback may be represented as a binary 1 for positive feedback and as a binary 0 for negative feedback (or no response at all). The machine learning model and training algorithm used may be according to any approach known in the art, such as a deep neural network (DNN) training algorithm.

As described above, user feedback is provided with respect to groups of images and their corresponding products rather than individual images for individual products. Accordingly, the training data entries may include some or all of:

- an entry for each product vector 1220 of the product vectors corresponding to the group of images, with the each product vector 1220 as the input and the feedback on the group of images as the output.
- An aggregation of the product vectors 1220 corresponding to the group of images (e.g. the value at each element position as an average of the values of the individual product vectors 1220 for that element position), the aggregation being the input and the feedback being the output.
- An aggregation o the product vectors 1220 of the cluster from which the images were selected (e.g. the value at each element position as an average of the values of the individual product vectors 1220 of the cluster for that element position), the aggregation being the input and the feedback being the output.

Figure 15:
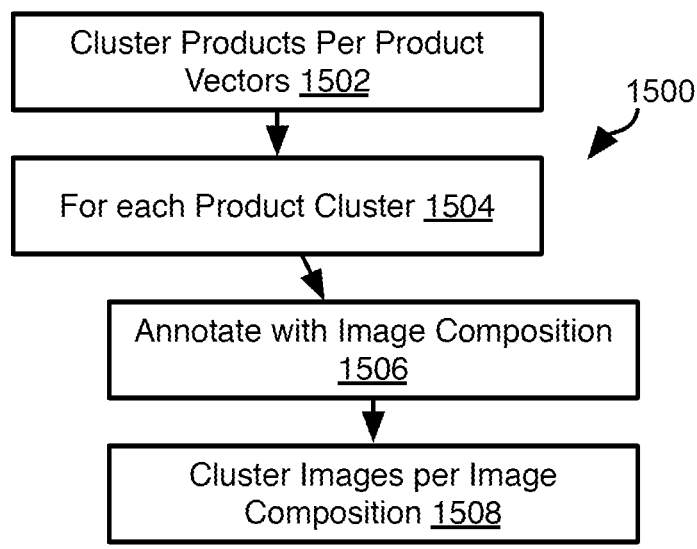
FIG. 15 is a process flow diagram of a method for clustering products and product data in accordance with an embodiment of the present invention.

Note the method 1600 is described with respect to product clusters 1402. In some embodiments, the product vectors of a product cluster 1402 may be further clustered into product sub-clusters. In some embodiments, an individual product may be processed in the same manner as a cluster, i.e. a cluster comprising a single product, in order to obtain information regarding that specific product. Accordingly, the method 1600 may be performed on the sub-cluster level such that images of a product sub-cluster are clustered (per FIGS. 14 and 15) and a product sub-cluster and images for the selected product sub-cluster are selected at step 1602 and

1604. Likewise, if there is a product cluster-based aggregation, this may be performed with respect to the product vectors of the sub-cluster.

Referring to FIG. 18, the illustrated method 1800 may be used to select a product cluster or sub-cluster at step 1602. The method 1800 may include evaluating 1802 whether a product cluster 1402 is unrepresented, where "unrepresented" indicates that a number of times a user has provided feedback with respect to the cluster is below a predetermined threshold.

If there are one or more unrepresented product clusters, the method 1800 may include selecting 1804 one of them, such as randomly or according to some other criteria, such as proximity to a cluster 1402 for which the user previously provided positive feedback ("a positive cluster"). Proximity may be determined based on similarity of product vectors, e.g. a dot product of an aggregate product vector of the clusters being evaluated for proximity.

If there are no unrepresented clusters 1402, the method 1800 may include evaluating 1806 whether there is a positive cluster 1402 with an unrepresented sub-cluster. If so, then one of the unrepresented sub-clusters of one of the positive clusters 1402 may be selected 1808, either randomly or according to proximity to a positive sub-cluster of the positive cluster. For example, the positive cluster 1402 with the largest number of unrepresented sub-clusters may be selected and a sub-cluster of it may be selected either randomly or according to proximity to a positive sub-cluster of the selected positive cluster 1402.

If there are no unrepresented product clusters 1402 or sub-clusters of positive product clusters 1402, the method 1800 may include selecting 1810 a least represented cluster or sub-cluster. Alternatively, a product cluster 1402 or sub-cluster of a product cluster 1402 may be selected at random, including clusters that previously received negative feedback.

Note that the set of product clusters 1402 considered according to the method 1800 may be a subset of available product clusters 1402, such as those corresponding to the user's gender or some other known preference of the user.

Note also that there may be any number of levels of clusters 1402, sub-clusters, and sub-sub clusters, each generated according to a clustering algorithm based on the product vectors 1220. Accordingly, in response to determining that there are no un-represented sub-clusters of positive clusters 1402, the method 1400 may be repeated with the positive sub-clusters in the place of the positive clusters 1402 and sub-sub clusters in the place of the sub-clusters, i.e. selecting unrepresented sub-sub-clusters of positive sub-clusters until they are all represented.

FIGS. 19 and 20 illustrate methods 1900 and 2000 that may be executed in order to use the user preference model created according to the method 1600. The method 1900 may include receiving 1902 a query and performing 1904 a search for products corresponding to the query. The manner in which the search is performed may be according to any search algorithm known in the art and may take into account demographic or physical attributes known for the user (gender, age, size, etc.).

The results of the search from step 1904 may be scored 1906 according to the user preference model. As described above, the user preference model takes as input a product vector 1220 and outputs a score indicating a likelihood that the product corresponding to the product vector 1220 will be liked by a user. Accordingly, the product vectors 1220 of the search results may be processed according to the user model to generate the scores for the search results. The search results may then be ranked and/or filtered 1908 according to the scores. For example, the M search results with the highest scores may be selected and the remaining search results removed, where M is a predefined integer, e.g. a value from 10 to 30. The M remaining search results may be ranked from highest to lowest score and presented 1910 to the user, such as by transmitting representations of them to the user device 126 from which the query was received at step 1902, e.g. images 1204 and descriptions 1208 for the product records 1202 identified during the search 1904.

Referring to FIG. 20, in another use case, a user selects a product, such as from an advertisement, a list of search results (see discussion of FIG. 16), a feed of the user, the feed of another user (such as a celebrity influencer), or other context. For example, the method 2000 may include receiving 2002, notification of a product selection, such as from the user device 126. The notification may, for example, include an identifier of a product record 2002 ("the selected product").

The method 200 may include identifying 2004 related products. This may include identifying alternatives to the selected product, accessories used with the selected product, products frequently purchased with the selected product, or having some other relationship to the selected product. The related products may be identified according to any approach known in the art.

The method 2000 may include scoring 2006 the related products according to their product vectors 1220 and ranking and/or filtering 2008 the related products according to the scores. This may be performed in the same manner described above with respect to steps 1906 and 1908. A representation of the ranked products remaining after step 2008 may be presented 2010 to the user, such as in the manner described above with respect to FIG. 1910. In particular, the related products may be presented on a product webpage for the selected product.

Figure 21:
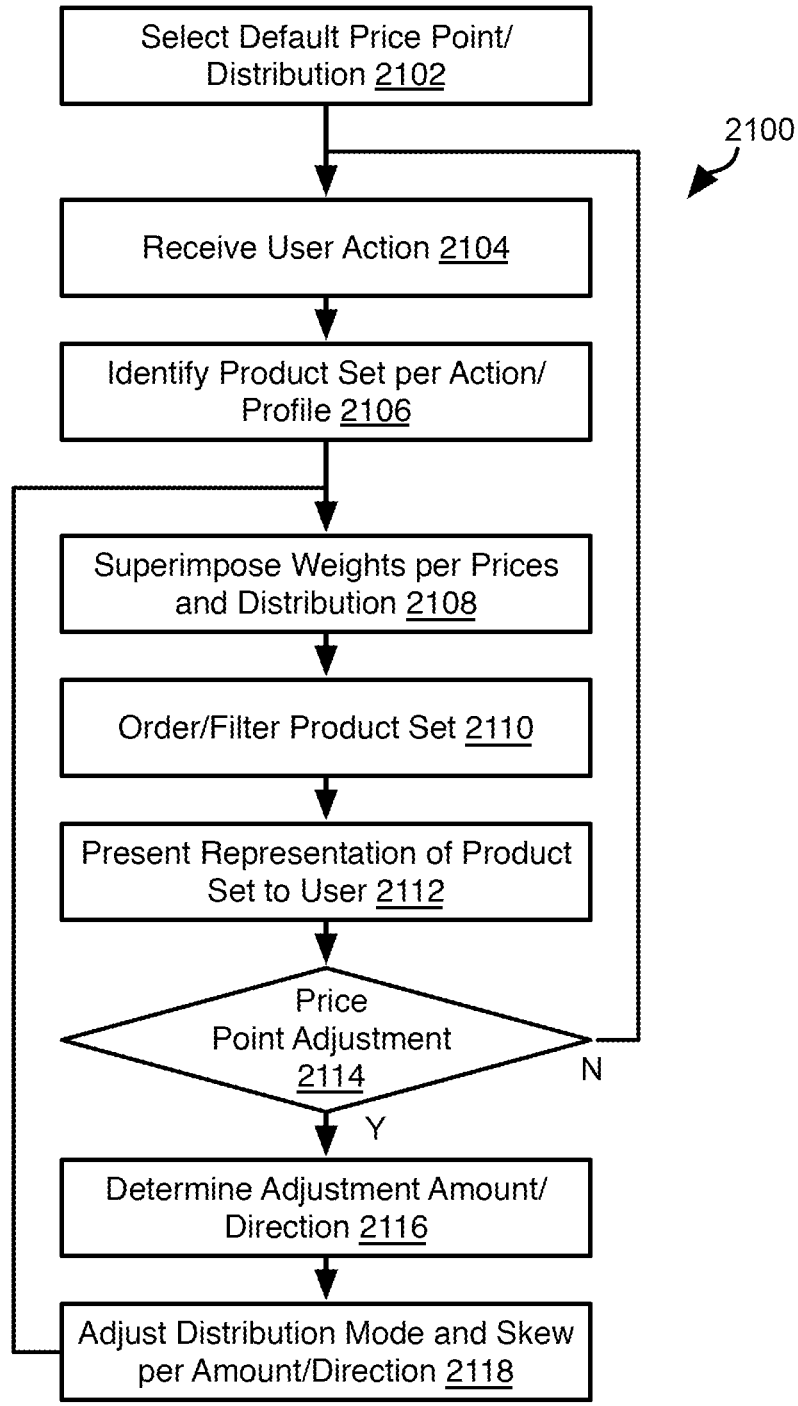
FIG. 21 is a process flow diagram of a method of receiving and applying user feedback with respect to product price in accordance with an embodiment of the present invention.

Referring to FIG. 21, the illustrated method 2100 may be used to receive and implement feedback from a user with respect to product price. A user profile generated according to the foregoing methods or according to any other approach for generating a user profile as known in the art may include an estimate of a user's typical price range, i.e. whether the user typically buys luxury versions of products or more economical versions. However, such an estimate does not necessarily apply to all products the user purchases. For some products, the user may be interested in high end versions, such as for the user's hobbies or for clothing for a special occasion. For other products, such as for daily use, the user may instead tend to buy cheaper versions of products. Accordingly, the method 2100 provides an improved approach that may be executed by a server system, such as the server system 124 in order to adapt the weight given to receive user feedback regarding price and use that feedback in ordering and/or filtering products to be presented to a user.

The method 2100 may include selecting 2102 a default price point and a default distribution. The default may be a global default used for all users or be based on data received from a the user or inferred from user browsing or purchasing activity. For example, the default price point could be an average price of products purchased by the user during a time window or all purchases known for the user. The default price point could be an average price paid by the user for a type of product that is the subject of the method 2100, i.e. a product type that the user is searching, the type for a product page the user is viewing, or the like. In a like manner, the default price point could additionally or alternatively be a function of products browsed: the average price of products clicked on by the user for all clicks or clicks within a most recent time window, the average price of products having the same type as the product type that is the subject of the method 2100, or some other approach.

The method 2100 may further include receiving 2104 some type of user action 2104 that results in identifying a set of products corresponding to one or both of data defining the user action 2104 and the user profile of the user. Steps 2104 and 2106 may include any user action and identifying a set of products, i.e. set of product records in a database of product records, according to any approach known in the art. User actions may include submitting a search query, clicking on a link to a product page, clicking on a link in an email, visiting a webpage that includes code for invoking and retrieval of a set of products in the form of an advertisement or set of related products.

In one embodiment, the set of products are identified using the approaches described above with respect to some or all of FIGS. 1 through 20. The set of products may be identified using any search algorithm or other approach known in the art for selecting a set of results having a relationship to a user query or a product or product type indicated by the user action.

The products as identified at step 2106 may be ranked, assigned scores indicating their estimated relevance to a user, or otherwise be in an order indicating the expected relevance of one product relative to another product, i.e. a list of product identifiers ordered from most to least relevant.

The method 2100 may further include superimposing 2108 weights on the set of products according to prices of the set of products and the distribution. For example, supposing the distribution is a function W(p) that outputs a weight for a given price p, the weight for a product $S_i$, in the set having a price $p_i$ would be $W_i=W(p_i)$. This weight may be superimposed on any ordering, ranking, or score assigned to that product, e.g., where $H_i$ is the order index, rank, or score of the product $S_i$, an adjusted score $G_i$ may be calculated as $F(H_i, W_i)$, where F is a sum, weighted sum, or some other function of $H_i$ and $W_i$. For example, where $H_i$ is an index with a lower index indicating higher relevance and where a weight $W_i$ is such that a higher value indicates higher relevance, then $F(H_i, W_i)$ could be $H_i/W_i$ or $H_i+1/W_i$, or some other function that increases with decreasing $H_i$ and increases with increasing $W_i$. In another example, where $H_i$ is a score or rank with a higher value indicating higher relevance and where a weight $W_i$ is such that a higher value indicates higher relevance, then $F(H_i, W_i)$ could be $H_i*W_i$ or $H_i+W_i$, or some other function that increases with increasing $H_i$ and increases with increasing $W_i$.

The method 2100 may then include ordering the set of products according to the scores Gi, e.g., lowest to highest where a low score indicates higher relevance or highest to lowest where a high score indicates higher relevance. In some embodiments, only the top N products with the highest relevance are selected whereas in other embodiments, all products remain in the set and are presented in order of relevance in response to scrolling or clicking through multiple pages of results.

A representation of the set of products is then presented 2112 to the user with an ordering corresponding to the order determined at step 2110. This may be according to any approach known in the art, such as in the form of an embedded set of recommended products on a product page or other webpage, a listing of identifiers and other information for the set of products as results of a search, or in some other form. The representation may be transmitted to a device of the user and rendered on a screen of the device, emailed to the user, or presented in some other form.

The method 2100 may further include evaluating 2114 whether an adjustment of the price point has been received from the user and, if so, determining 2116 an amount of the adjustment. For example, referring to FIGS. 22A to 22C, a webpage or other interface transmitted by the server system 124 to the user device 126 may include a user interface element enabling a user to increase or decrease the price point defining the distribution used at step 2108.

Figure 22A:
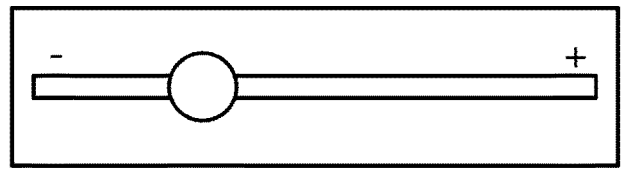
FIGS. 22A to 22C are example interfaces that may be used to receive user feedback with respect to price in accordance with an embodiment of the present invention.
Figure 22B:
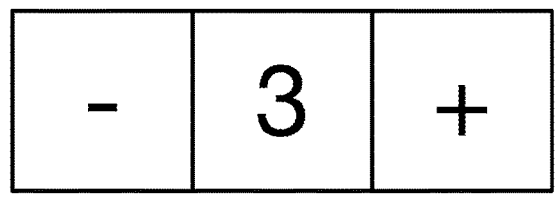
Figure 22C:
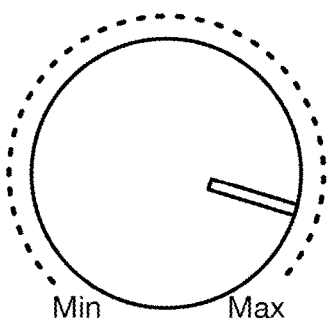

For example, as shown in FIG. 22A, the interface element may be slider such that the user may move the slider in one direction, e.g. to the right in the illustrated example, to increase the price point, and in the opposite direction to decrease the price. In the example of FIG. 22B, the interface element is a visual representation of a dial in one direction, clockwise in the illustrated example, to increase the price point and counterclockwise to decrease the price point. In the example of FIG. 22C, the user may click on the "−" button to decrease the price point and click on the "+" button to increase the price point. A field may display a value corresponding to user inputs regarding price point and therefore increases with clicks on the "+" button and decreases with clicks on the "−" button. Note that the value may be decoupled from the actual price point, i.e. indicate a relative value providing feedback to the user regarding changes to the price point but not indicating an actual price. In some embodiments, the displayed value is the actual price point that is the mode of the distribution used (see discussion below of FIGS. 23A to 23C).

The correspondence between user adjustments of the user interface element of whichever type and the price point may be according to various approaches. In a first approach, the number of price points selectable users is a fixed value, e.g. M=10, 20, 30, etc. The maximum and minimum price points may be set to be the maximum and minimum prices of the set of products. Accordingly, in some embodiments, price point 1 will set the price point at the minimum price and price point M will set the price point at the maximum price. The increment between price points between the minimum price and the maximum price may be linear, i.e. a fixed increment (max−min)/M or non-linear, i.e. a logarithmic scale, parabolic relationship, or any other function. Accordingly, for a fixed increment, the price point may be equal to Mean+Inc*IncrementCount, where Mean is the average of the maximum and minimum prices and IncrementCount is the number of increments input by the user. In this case IncrementCount is positive where the user increases the price point and negative where the user decreases the price point.

In the embodiment of FIG. 22A, IncrementCount corresponds to a distance from the middle of the slider that the user has moved the slider. In the embodiment of FIG. 22B, IncrementCount may include the number of dial positions the user has moved the dial from a center position. In the embodiment of FIG. 22C, increment count may be PlusClicks−NegClicks, where PlusClicks is the number of times the user has clicked on the "+" button and NegClicks is the number of times the user has clicked on the "−" button.

Referring again to FIG. 21, once the amount of an adjustment is known, the distribution may be adjusted 2118 according to the new price point. An example of how this may be done is described below with respect to FIGS. 23A to 23C. In some embodiments, following detecting a change of the price point by a user, a new distribution is calculated based on the price point and processing repeats starting at step 2108 with the new distribution. In some embodiments, the same set of products is used. In others, the set of products may be filtered based on the change of the price point. The new distribution may be used as the default price point and distribution at step 2102 in subsequent iterations of the method 2100.

Figure 23A:
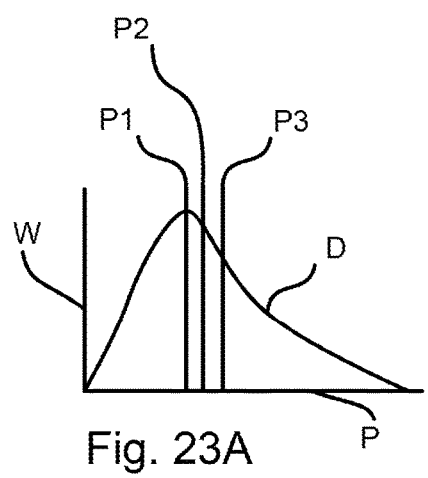
FIGS. 23A to 23C illustrate various distributions of weightings with respect to price that may be use in accordance with an embodiment of the present invention.
Figure 23B:
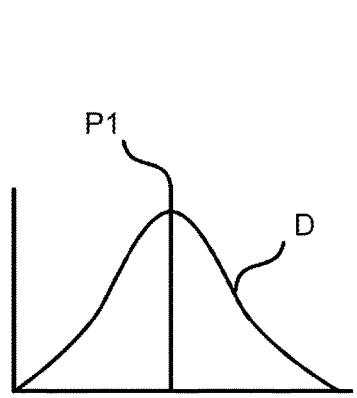
Figure 23C:
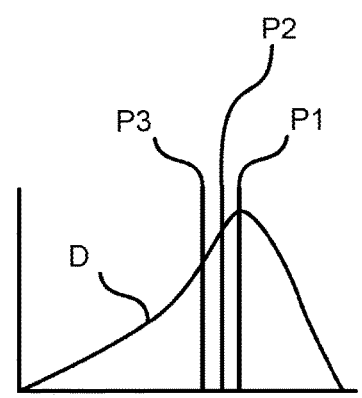

FIGS. 23A to 23C illustrate example distributions and their relationship to the price point, whether default or as adjusted in response to a user input. In the illustrated plots, the vertical axis W represents weight and the horizontal axis P represents price.

In FIG. 23B, the distribution is symmetrical about a mode P1, where the mode is set to be the price point. The distribution may be a Gaussian distribution D or some other distribution. In some embodiments, the symmetrical distribution D is the default distribution about the default price point that is used in the absence of user input. In other embodiments, the symmetrical distribution about a default or user specified price point is used in all cases.

In some embodiments, an asymmetrical distribution of FIG. 23A or 23C is used in cases where the user provides an input regarding a price point. As is apparent, the distributions D of FIGS. 23A and 23C are such that the median P2 is not equal to the mode P1 and the mean P3 is likewise note equal to the mode P1 and maybe such that the median P2 is between the mode P1 and the mean P3. For example, the distributions D of FIGS. 23A and 23C may be skewed Gaussian distributions.

For example, in the case where the user has increased the price point, the distribution of FIG. 23C will be used. Accordingly, products with prices closest to the price point will be weighted the highest but those that are higher than the price point by a given offset will be weighted higher than those that are below the price point by the same offset. Stated differently, the decline in the weight with distance from the price point is steeper below the price point than above the price point.

FIG. 23A illustrates the case where the user has decreased the price point. Products with prices closest to the price point will be weighted the highest but those that are lower than the price point by a given offset will be weighted higher than those that are above the price point by the same offset. Stated differently, the decline in the weight with distance from the price point is steeper above the price point than below the price point.

The illustrated distributions are exemplary only. Other functions that have a decline in value about a defined point may be used and may be configured to have the asymmetrical relationships of FIGS. 23A and 23C.

In some embodiments, the Gaussian distribution may be defined according to Equation 1, in which λ indicates the degree of skew, σ is the variance, µ is the mean (i.e., price point), erfc is the complimentary error function according to Equation 2, x represents price and f( ) is the weight output from the equation.

$$f(x, \mu, \sigma, \lambda) = \frac{\lambda}{2} e^{\frac{\lambda}{2}(2\mu + \lambda \sigma^2 - 2x)} erfc\left(\frac{\mu + \lambda \sigma^2 - x}{\sigma \sqrt{2}}\right) \quad (1)$$

$$erfc(y) = 1 - erf(y) = \frac{2}{\sqrt{\pi}} \int_y^\infty e^{-t^2} dt \quad (2)$$

FIGS. 24 through 27 illustrate an approach for providing dynamic filters. Algorithms may be used to select and rank search results according to a user's preferences, such as those described herein or according to any approach known in the art. However, such algorithms may not be consistent with a user's current objective at any moment in time. Accordingly, the approach described with respect to FIGS. 24 through 27 provides an improved approach that dynamically generates filters that a user may choose to implement in order to ensure that search results are relevant to the user's current objective.

Figure 24:
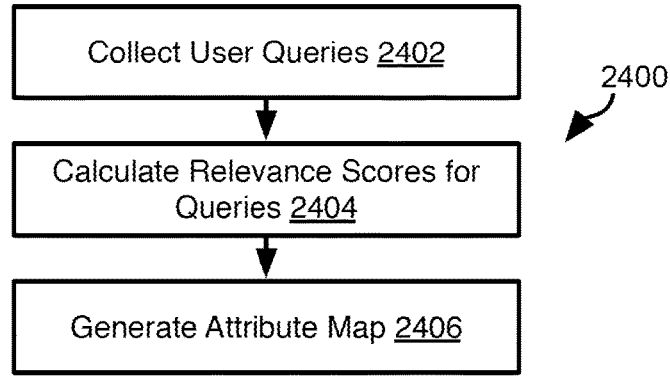
FIG. 24 is a process flow diagram of a method for creating an attribute map in accordance with an embodiment of the present invention.

Referring specifically to FIG. 24, in some embodiments, the dynamic generation of filters may make use of information regarding previously submitted queries by the user, all users, a group of users similar to the user that will be presented the dynamic filters, or some other set of users selected for processing according to the illustrated method 2400. The method 2400 may be executed by the server system 124 or any other server system programmed to receive a query and process it according to the method 2400. This server system may be the same as or different from the server system that processes the query and identifies search results relevant to the query.

For example, the method 2400 may include collecting 2402 queries submitted by the user or set of users selected for processing according to the method 2400. For example, queries may be collected 2402 during a time period preceding executing of the illustrated method 2400, such as a period having a length of one day, one week, one month, one year, or any number of any of these time periods or some other time period. In other embodiments, all queries available to the system are processed according to the method 2400.

The method 2400 may include calculating 2404 relevance scores for each query and generating 2406 an attribute map according to the queries and their relevance scores. Calculating 2404 relevance scores for a query may be a function of popularity, i.e. the relevance score for a query may be a function of a number of times the query has occurred among the queries collected at step 2402 such that the relevance score increases with the number of times the query has occurred.

Generating 2406 the attribute map may include, for each query of the collected queries, identifying attributes and values for attributes included in the query. For example, a query may be for "skinny blue jeans" and this query may have a relevance score of 43. The <attribute>:<value> pairs in this query may include leg_style:SKINNY, color_type: BLUE, subcategory:JEAN.

The attribute map based on a query could include entries wherein the first item in the entry enclosed in single quotes (' ') is an <attribute>:<value> pair from those of the query and indicates the key of the entry and the second item enclosed in brackets ([ ]) lists other attributes associated with the key. For example, for the example query the following attribute map may be generated:

'color_type:BLUE  leg_style:SKINNY  subcategory: JEAN':[ ]
'color_type:BLUE  leg_style:SKINNY': [subcategory: JEAN:43]
'leg_style:SKINNY  subcategory:JEAN':  [color_type: BLUE:43]
'color_type:BLUE  subcategory:JEAN':  [leg_style: SKINNY:43]
'leg_style:SKINNY': [color_type:BLUE:43, subcategory:JEAN:43]
'color_type:BLUE': [leg_style:SKINNY:43, subcategory:JEAN:43]
'subcategory:JEAN': [color_type:BLUE:43, leg_style: SKINNY:43]

As is apparent, the attributes associated with the label in each entry have the relevance score (43) of the query associated therewith. The attribute map may be sorted alphabetically by the keys for use according to the methods disclosed herein.

There may be instances where two attributes occur together in more than one query. For example, suppose a second query is "distressed blue jeans" and has a relevance score of 55. The entries in the attribute map that are keyed to color_type:BLUE and subcategory:JEAN may be updated accordingly, such as by adding (43+55=98 in this example) the relevance score of the second query to the relevance score associated with the co-occurring attribute. For example, in view of the second query the attribute map may be updated as follows:

'color_type:BLUE': [leg_style:SKINNY:43, subcategory:JEAN:98, style:DISTRESSED:55]
'subcategory:JEAN': [color_type:BLUE:98, leg_style:SKINNY:43, style:DISTRESSED:55]

Note that in this example that an attribute (style:DISTRESSED:55) of the second query that does not occur in the first query is also added to the entries having one of the cooccurring attributes in the first query as a key and having the relevance score of the second query associated with it. An entry may also be added to the attribute map with its key equal to the attribute that does not occur in the first query and that includes the attributes that occur in the first query:

'style:DISTRESSED': [subcategory:JEAN:98, color_type:BLUE:98]

In the case where there is a third query, or any number of other queries, the attribute map as updated according to the second query or any prior processed query may be further updated in the same manner as described above with respect to the second query.

Figure 25:
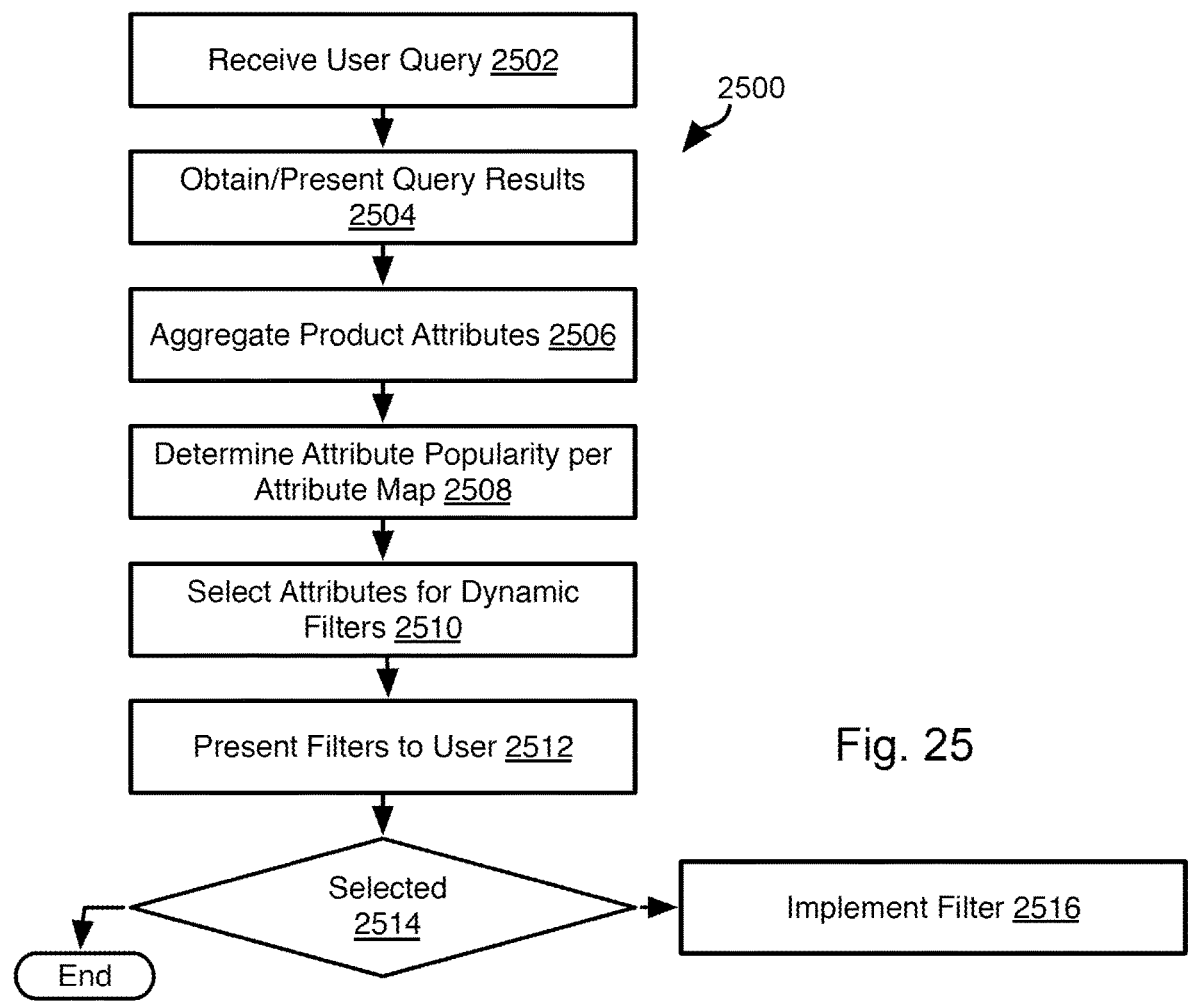
FIG. 25 is a process flow diagram of a method for generating dynamic filters in accordance with an embodiment of the present invention.

FIG. 25 illustrates a method 2500 that may be executed by the server system 124 or other server system. The method 2500 may be used to dynamically generate filters after a user query has been received and search results have been identified. Stated differently, the filters generated according to the method 2500 are not defined prior to the query being received from the user and search results have been identified in response to the query.

The method 2500 may therefore include receiving 2502 a user query and obtaining 2504 and presenting search results from the query to the user. For example, the query may be received from a user device 126 and results of the query may be transmitted back to the user device 126 with instructions to render the results on a screen of the user device 126. As noted above, the server system that receives the query from the user and performs a search algorithm to identify results may be the same as or different from the server system that generates dynamic filters according to the method 2500.

The method 2500 may include aggregating 2506 the attributes (i.e. attribute:value pairs) of the search results. For example, let each search results be a product record P having attribute-value pairs A, where A is an attribute-value pair including an attribute (e.g., color) and a value for that attribute (e.g., blue). Each product record P may further have a relevance score indicating relevance to the user query and possibly based on relevance of the product record to a profile of the user. The relevance score may be according to any approach known in the art such as those described hereinabove. Aggregating 2506 may be performed with respect to all product records P or only to those having the highest relevance score, i.e. the top N highest relevance scores where N is a predefined number such as an integer between 3 and 100. Note that in some embodiments, the value of N may be dynamic. For example, N could be based on the device 126 of the user: a mobile device with a small screen could use a small value of N and a desktop with a larger screen could use a larger value of N. In another example, the value of N is based on user affinity, i.e. how often a user typically swipes (i.e. provides feedback) on search results: more typical feedback means a larger value of N.

For example, consider the example, in which there are three top search results P1, P2, and P3, P1 having attribute-value pairs A1, A2, and A3; P2 having attribute-value pairs A1, A5, and A6, and P3 having attribute-value pairs A1, A3, A6.

Aggregating 2506 may include counting the number of occurrences of each attribute-value pair represented in the attribute-value pairs of the top search results. In this example, this would be A1 has 3 occurrences, A3 has 2 occurrences, A6 has 2 occurrences, A2 has 1 occurrence, and A5 has one occurrence.

Popularity of represented attribute-value pairs may be further determined 2508 according to an attribute map indicating popularity of each attribute, such as an attribute map generated according to the method 2400. For example, for each attribute-value pair represented in the query, those entries having that attribute-value pair in them may be identified. For example, if the query includes the word "jeans," then entries in the attribute map including "subcategory: jeans" would be identified. The attribute-values pairs associated with the attribute-value pair(s) of the query in entries in the attribute map ("key pairs") and their relevance scores may then be identified. The key pairs for each attribute-value pair represented in the top search results may then be ranked according to their relevance scores. In some instances, there may be attribute-value pairs among the key pairs that do not correspond to attribute-value pairs represented in the top search results. In some embodiments, these are removed prior to ranking. In other embodiments, they are retained.

The method 2500 may include selecting 2510 one or more attribute value pairs from among those represented by the top search results as the basis for dynamically-generated filters. For example, the represented attribute value pairs have a number of occurrences and a relevance score from steps 2506 and 2508. These may be combined by means of addition, weighted addition, multiplication, or some other function. The top M attribute-value pairs with the highest combined scores may then be selected 2510, where M is a predefined integer such as a value from 3 to 10. The value of M may be dynamic in some embodiments.

The method 2500 may then include presenting 2512 to a user, one or more interface elements that may be selected by the user in order to invoke filtering according to the selected attribute-value pairs from step 2510.

Figure 26:
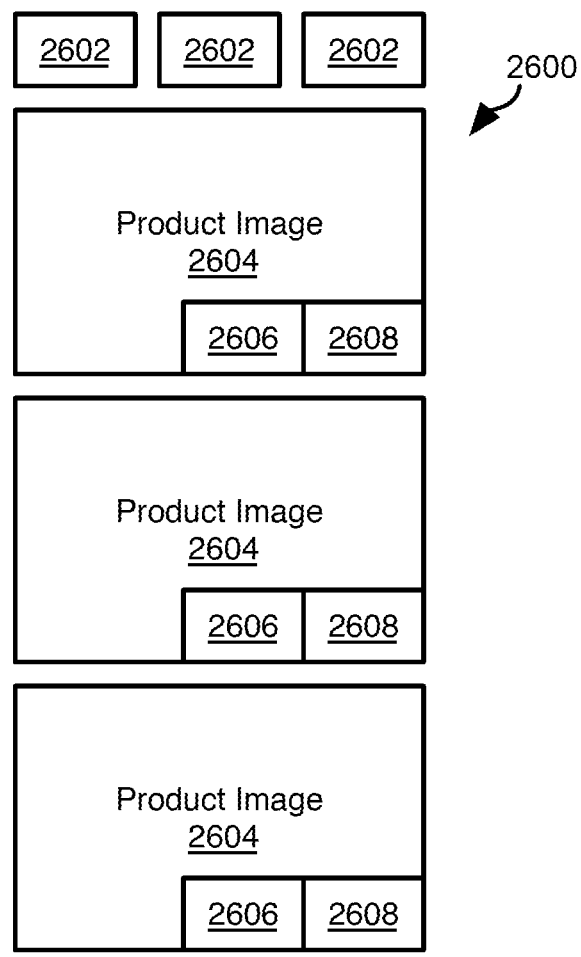
FIG. 26 is a diagram illustrating an example interface including dynamic filters in accordance with an embodiment of the present invention.

For example, referring to FIG. 26, the server system of the method 2400 may transmit instructions to the user device 126 to generate the illustrated interface 2600. The interface may include a number of filter interface element 2602 and a listing of the search results, such as in the form of a set of product images 2604 and/or text identifying each product represented in the interface. The interface may be scrollable, i.e. a user may scroll through search results from highest to lowest relevance to the search query and/or the user's profile.

The filter interface elements 2602 may include text listing the attribute-value pair, or the value alone, of the attribute-value pair selected at step 2510 to which the filter interface element 2602 corresponds. Upon determining 2514 that a notification from the user device 126 that the user has selected a filter interface element 2602, the server system executing the method 2500 may implement 2516 the filter.

Implementing 2516 may include excluding one or more search results from the search results from step 2504 according to the attribute-value pair associated with that filter interface element 2602.

In some embodiments, each filter interface element 2602 may present options to a user and receive user selection of an option of those options, where the options include some or all of options to: exclude all product records that lack the attribute-value pair associated with the each filter interface element 2602; exclude all product records that include the attribute-value pair associated with the each filter interface element 2602; remove the filter interface element 2602 as not of interest to the user. The server system executing the method 2500 may then implement the option selected by the user as reported by the user device 126. Where the option selected results in a change in the search results to be displayed, the server system may send an updated set of search results for presenting on the user device 126.

In some embodiments, user interactions with the representations 2604 of the search results may be reported by the user device 126 to the server system. In some embodiments, each representation 2604 of a search result may include one or more interface elements 2606, 2608 for providing feedback. For example, one element 2606 may enable a user to provide positive feedback, i.e. include text or an image indicating a positive sentiment, such as "yes," a thumbs up icon, a "+" sign, or some other text or symbol. The other element 2608 may enable a user to provide negative feedback, i.e. include text or an image indicating a positive sentiment, such as "yes," a thumbs up icon, a "+" sign, or some other text or symbol. The user may then select one of these interface elements 2606, 2608 on a representation of a search result and the user device 126 may inform the server system of the selection.

In some embodiments, feedback may be received by a user swiping an image left for negative feedback and swiping the image right for positive feedback such that additional user interface elements 2606, 2608 are omitted.

Figure 27:
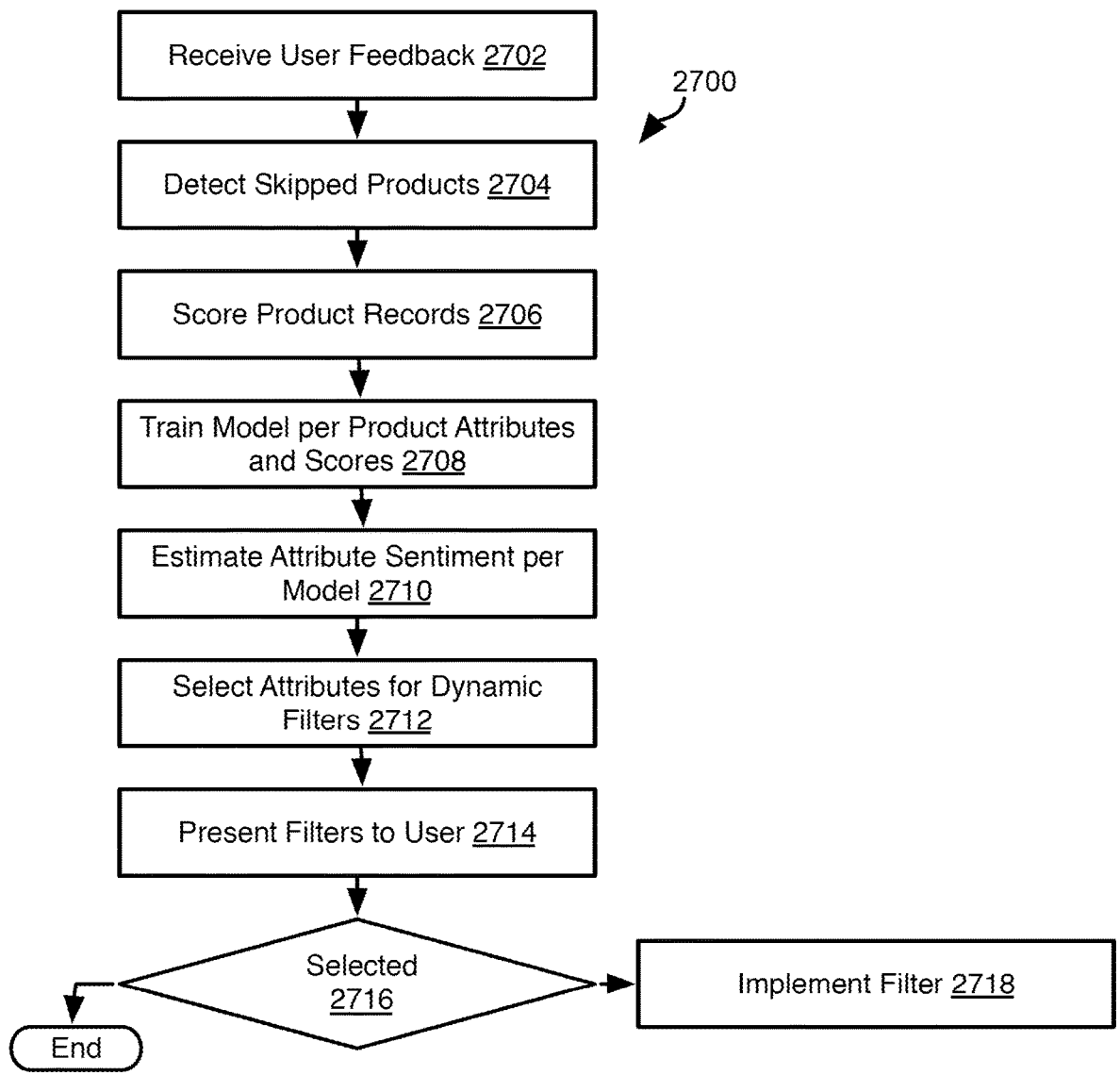
FIG. 27 is a process flow diagram of a method for generating dynamic filters based on feedback during a browsing session in accordance with an embodiment of the present invention.

FIG. 27 illustrates a method 2700 that may be executed to generate dynamic filters after all of receiving a query, obtaining search results for the query, and presenting the search results of the query, with the dynamic filters being applied to filter the search results for the query. The method 2700 may be executed by the server system 124 or other server system executing the methods 2500 and/or 2700.

The method 2700 may include receiving 2702 user feedback with respected to representations of search results, such as by means of interface elements 2706 and/or 2708, swiping left or right, or some other means. The method 2700 may further include detecting 2704 skipping of search results, i.e. a user providing neither positive nor negative feedback with respect to a representation 2604 of a product. Skipping 2704 may also be defined as the user not clicking on a representation 2604 of a product in order to visit the product page for that product.

The method 2700 may then include assigning scores to the search results according to the feedback. For example, product records may be assigned a score of 1 for positive feedback, 0 for skipping, and −1 for negative feedback. For example, for product records P1 to P6 with attributes A1 to A10, scores may be assigned as follows:

P1 (A1, A2)→1
P2 (A1, A3, A4)→1
P3 (A5, A6, A7)→−1
P4 (A5, A9, A10)→−1
P5 (A2, A3)→0
P6 (A7, A10)→0

The method 2700 may then include training 2708 a model to relate product attribute-value pairs to an expected user sentiment (positive, skip, negative) using the scored product records and their attribute-value pairs. For example, training data may include a plurality of entries in which each entry includes a set of attribute-value pairs of a product record as an input and the score (1, 0, −1) as a desired output. The model may then be trained to provide an estimated score for a given input set of attribute-value pairs, or for a single attribute-value pair.

The model and training algorithm may be implemented according to any machine learning approach known in the art, such as neural network, deep neural network, or the like. In other embodiments, the model and training algorithm are implemented using logistic regression.

The method may then include estimating 2710 attribute sentiment according to the model. This may include inputting an attribute-value pair to the model and obtaining an estimated sentiment from the model, which may be in the form of a floating point value from −1 to 1, with a higher value indicating a higher probability of positive sentiment and a lower value indicating a higher probability of negative sentiment. Alternatively, the model itself may associate coefficients with attribute-value pairs such that this coefficient may be read from the model to obtain its estimated sentiment.

The method 2700 may then include selecting 2712 one or more attribute-value pairs from the estimated sentiments from step 2710. For example, this may include selecting the top Q1 attribute-value pairs with the highest sentiment estimates (most likely positive) may be selected, where Q1 is a predefined integer. This may further include selecting the bottom Q1 attribute-value pairs with the lowest sentiment estimates (most likely negative) may be selected.

Filters may then be presented 2714 by the server system to the user device 126 according to the selected attribute-value pairs from step 2712. For example, these filters may be added to the interface in the form of additional interface elements 2602 that list the attribute and value, or just the value, from the selected attribute-value pair. In some embodiments, an attribute-value pair selected as having high positive sentiment may, upon selection of its corresponding interface element 2602 by a user, invoke exclusion of all product record lacking that attribute-value pair. In some embodiments, an attribute-value pair selected as having high negative sentiment may, upon selection of its corresponding interface element 2602 by a user, invoke exclusion of all product record having that attribute-value pair. The interface elements 2602 may include visual indicators indicating whether it functions as an "exclude lacking" or "exclude including" filter.

If one of the interface elements of a filter presented at step 2714 is found 2716 to be selected, such as from a notification received from the user device 126, the method 2700 may include implementing 2718 the filter, i.e. excluding items lacking the attribute-value pair of the selected filter or excluding items including the attribute-value pair of the selected filter as defined by the filter by default or as specified by the user. As noted with respect to FIG. 25, this may include altering which product records are represented in the interface 2600 to include representations 2604 of only those product records that remain after implementing 2718.

Figure 28:
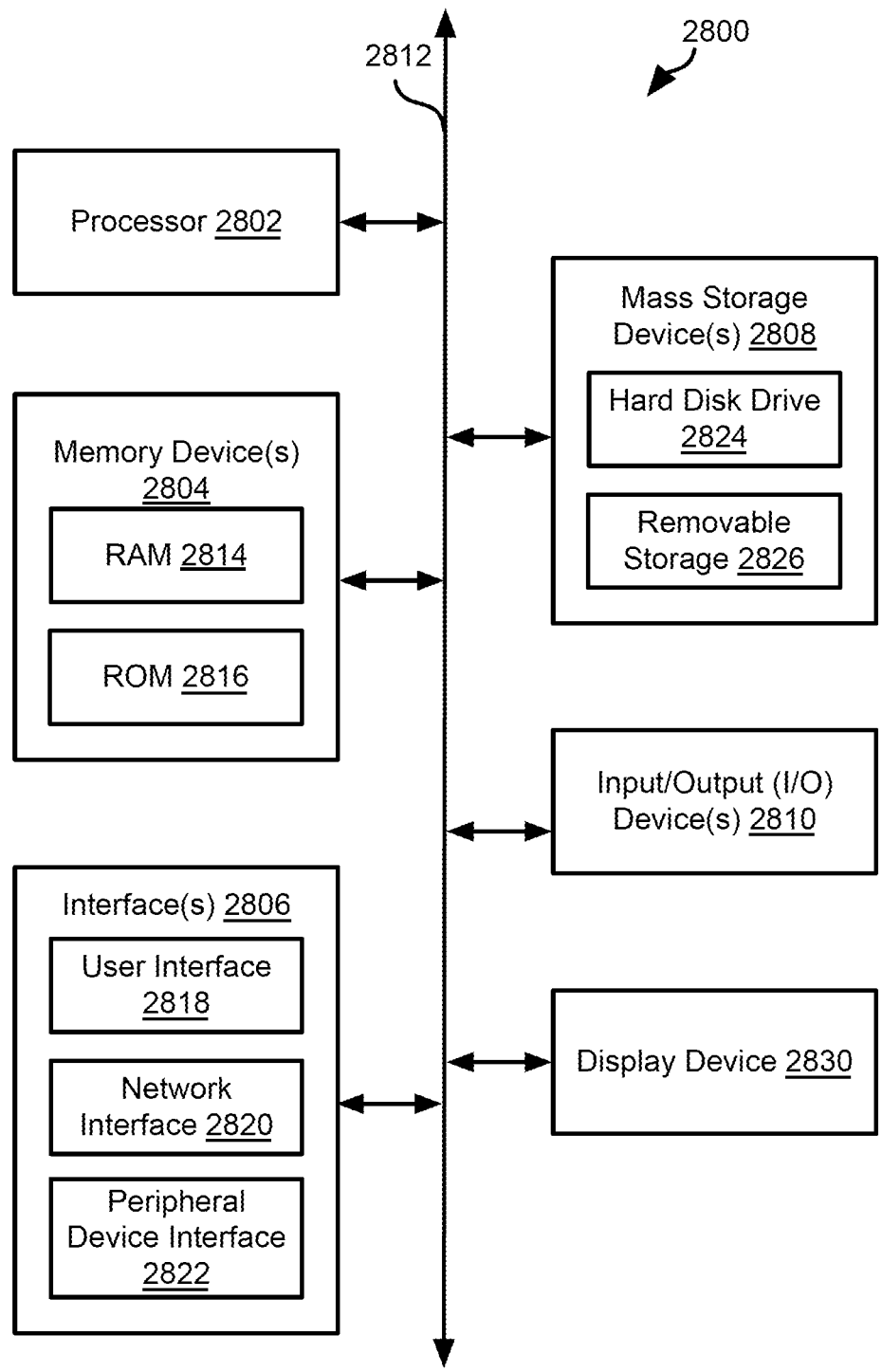
FIG. 28 is a schematic block diagram illustrating an example computing device suitable for implementing methods in accordance with embodiments of the present invention.

FIG. 28 is a block diagram illustrating an example computing device 2800. Computing device 2800 may be used to perform various procedures, such as those discussed herein. A server system 124 may include one or more computing devices 2800 and a user computing device 126 may be embodied as a computing device 2800.

Computing device 2800 includes one or more processor(s) 2802, one or more memory device(s) 2804, one or more interface(s) 2806, one or more mass storage device(s) 2808, one or more Input/Output (I/O) device(s) 2810, and a display device 2830 all of which are coupled to a bus 2812. Processor(s) 2802 include one or more processors or controllers that execute instructions stored in memory device(s) 2804 and/or mass storage device(s) 2808. Processor(s) 2802 may also include various types of computer-readable media, such as cache memory. The processor 2802 may be embodied as or further include a graphics processing unit (GPU) including multiple processing cores.

Memory device(s) 2804 include various computer-readable media, such as volatile memory (e.g., random access memory (RAM) 2814) and/or nonvolatile memory (e.g., read-only memory (ROM) 2816). Memory device(s) 2804 may also include rewritable ROM, such as Flash memory.

Mass storage device(s) 2808 include various computer readable media, such as magnetic tapes, magnetic disks, optical disks, solid-state memory (e.g., Flash memory), and so forth. As shown in FIG. 28, a particular mass storage device is a hard disk drive 2824. Various drives may also be included in mass storage device(s) 2808 to enable reading from and/or writing to the various computer readable media. Mass storage device(s) 2808 include removable media 2826 and/or non-removable media.

I/O device(s) 2810 include various devices that allow data and/or other information to be input to or retrieved from computing device 2800. Example I/O device(s) 2810 include cursor control devices, keyboards, keypads, microphones, monitors or other display devices, speakers, printers, network interface cards, modems, lenses, CCDs or other image capture devices, and the like.

Display device 2830 includes any type of device capable of displaying information to one or more users of computing device 2800. Examples of display device 2830 include a monitor, display terminal, video projection device, and the like.

Interface(s) 2806 include various interfaces that allow computing device 2800 to interact with other systems, devices, or computing environments. Example interface(s) 2806 include any number of different network interfaces 2820, such as interfaces to local area networks (LANs), wide area networks (WANs), wireless networks, and the Internet. Other interface(s) include user interface 2818 and peripheral device interface 2822. The interface(s) 2806 may also include one or more peripheral interfaces such as interfaces for printers, pointing devices (mice, track pad, etc.), keyboards, and the like.

Bus 2812 allows processor(s) 2802, memory device(s) 2804, interface(s) 2806, mass storage device(s) 2808, I/O device(s) 2810, and display device 2830 to communicate with one another, as well as other devices or components coupled to bus 2812. Bus 2812 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 2800, and are executed by processor(s) 2802. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s). At least some embodiments of the disclosure have been directed to computer program products comprising such logic (e.g., in the form of software) stored on any computer useable medium. Such software, when executed in one or more data processing devices, causes a device to operate as described herein.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

What is claimed is:

1. A method comprising:
   determining, based at least in part on a query attribute-value pair associated with a query and an attribute map, a first plurality of key pairs;
   determining a first plurality of attribute-value pairs associated with a first plurality of search results determined to be responsive to the query;
   identifying, based at least in part on the first plurality of key pairs and the first plurality of attribute-value pairs, a second plurality of attribute-value pairs from the first plurality of attribute-value pairs;
selecting at least a portion of the second plurality of attribute-value pairs as filter elements;
causing a filter interface including the filter elements and at least a portion of the first plurality of search results to be presented;
receiving a selection of a first filter element of the filter elements; and
causing the first plurality of search results to be filtered based on the selected first filter element.

2. The method of claim 1, further comprising:
determining, for each of a plurality of queries, a respective query relevance score;
determining a third plurality of attribute-value pairs associated with the plurality of queries;
determining, based on the respective query relevance scores, a respective relevance score for each of the third plurality of attribute-value pairs; and
generating the attribute map based on the third plurality of attribute-value pairs and the respective relevance scores for each of the third plurality of attribute-value pairs.

3. The method of claim 2, wherein identifying the second plurality of attribute-value pairs includes:
determining a second plurality of key pairs of the first plurality of key pairs, the second plurality of key pairs corresponding to attribute-value pairs included in the first plurality of attribute-value pairs;
ranking the second plurality of key pairs according to the respective relevance scores; and
providing the ranked second plurality of key pairs as the second plurality of attribute-value pairs.

4. The method of claim 1, wherein identifying the second plurality of attribute-value pairs includes:
determining that a first key pair of the first plurality of key pairs is not included in the first plurality of attribute-value pairs;
removing the first key pair from the first plurality of key pairs to generate a second plurality of key pairs;
ranking the second plurality of key pairs according to the respective relevance scores; and
providing the ranked second plurality of key pairs as the second plurality of attribute-value pairs.

5. The method of claim 1, wherein determining the first plurality of attribute-value pairs associated with the first plurality of search results includes:
aggregating a second plurality of attribute-value pairs associated with the first plurality of search results based on a number of occurrences of each of the second plurality of attribute-value pairs in the first plurality of search results; and
selecting the first plurality of attribute-value pairs from the second plurality of attribute-value pairs based at least in part on the number of occurrences.

6. The method of claim 1, further comprising:
determining the first plurality of search results from a second plurality of search results based at least in part on a corresponding relevance of the first plurality of search results.

7. A computing system, comprising:
one or more processors; and
a memory storing program instructions that, when executed by the one or more processors, cause the one or more processors to at least:
determine, for each of a first plurality of search results determined to be responsive to a query, a respective search result relevance score;
determine, based at least in part on the respective search result relevance scores, a second plurality of search results from the first plurality of search results;
determine a first plurality of attribute-value pairs associated with the second plurality of search results;
determine, for each of the first plurality of attribute-value pairs, a respective number of occurrences in the second plurality of search results;
select, based at least in part on the respective number of occurrences, at least a portion of the first plurality of attribute-value pairs as filter elements;
cause a filter interface including the filter elements and at least a portion of the first plurality of search results to be presented;
receive a selection of a first filter element of the filter elements; and
cause the first plurality of search results to be filtered based on the selected first filter element.

8. The computing system of claim 7, wherein:
the program instructions, when executed by the one or more processors, further cause the one or more processors to at least:
determine, based at least in part on a query attribute-value pair associated with the query and an attribute map, a first plurality of key pairs;
determine that a second plurality of key pairs from the first plurality of key pairs is represented in the first plurality of attribute-value pairs; and
select at least a portion of the second plurality of key pairs as additional filter elements; and
the filter interface includes the additional filter elements.

9. The computing system of claim 8, wherein the program instructions, when executed by the one or more processors, further cause the one or more processors to at least:
determine, for each of a plurality of queries, a respective query relevance score;
determine a second plurality of attribute-value pairs associated with the plurality of queries;
determine, based on the respective query relevance scores, a respective relevance score for each of the second plurality of attribute-value pairs; and
generate the attribute map based on the second plurality of attribute-value pairs and the respective relevance scores for each of the second plurality of attribute-value pairs.

10. The computing system of claim 9, wherein determination of the respective relevance score for each of the second plurality of attribute-value pairs includes:
determining the respective query relevance scores for queries of the plurality of queries with which an attribute-value pair of the second plurality of attribute-value pairs is associated; and
combining the determined respective query relevance scores to determine the respective relevance score for the attribute-value pair.

11. The computing system of claim 8, wherein the attribute map includes a plurality of mapped attribute-value pairs and a respective relevance score for each of the plurality of mapped attribute-value pairs.

12. The computing system of claim 11, wherein the program instructions, when executed by the one or more processors, further cause the one or more processors to at least:

rank the second plurality of key pairs according to the respective relevance scores.

13. The computing system of claim 11, wherein:
selection of the filter elements and the additional filter elements is based at least in part on a combination of the respective number of occurrences and the respective relevance score.

14. A computer-implemented method, comprising:
determining, for each of a first plurality of search results determined to be responsive to a query, a respective search result relevance score;
determining, based at least in part on the respective search result relevance scores, a second plurality of search results from the first plurality of search results;
determining a first plurality of attribute-value pairs associated with the second plurality of search results;
determining, for each of the first plurality of attribute-value pairs, a respective number of occurrences in the second plurality of search results;
determining, based at least in part on a query attribute-value pair associated with the query and an attribute map, a first plurality of key pairs;
determining, based at least in part on the first plurality of key pairs and the first plurality of attribute-value pairs, a plurality of common attribute-value pairs, wherein the plurality of common attribute-value pairs correspond to the first plurality of key pairs that are represented in the first plurality of attribute-value pairs;
determining, for each of the plurality of common attribute-value pairs and based at least in part on the attribute map, a respective relevance score; and
selecting, based at least in part on the respective number of occurrences and the respective relevance scores, at least a portion of the plurality of common attribute-value pairs as filter elements.

15. The computer-implemented method of claim 14, further comprising:
determining, for each of a plurality of queries, a respective query relevance score;
determining a second plurality of attribute-value pairs associated with the plurality of queries;
determining, based on the respective query relevance scores, a respective relevance score for each of the second plurality of attribute-value pairs; and
generating the attribute map based on the second plurality of attribute-value pairs and the respective relevance scores for each of the second plurality of attribute-value pairs.

16. The computer-implemented method of claim 15, wherein determination of the respective relevance score for each of the second plurality of attribute-value pairs includes:
determining the respective query relevance scores for queries of the plurality of queries with which an attribute-value pair of the second plurality of attribute-value pairs is associated; and
combining the determined respective query relevance scores to determine the respective relevance score for the attribute-value pair.

17. The computer-implemented method of claim 14, further comprising:
updating the attribute map based at least in part on a second plurality of queries.

18. The computer-implemented-method of claim 14, further comprising:
causing a filter interface including the filter elements and at least a portion of the first plurality of search results to be presented;
receiving a selection of a first filter element of the filter elements; and
causing the first plurality of search results to be filtered based on the selected first filter element.

19. The computer-implemented method of claim 18, further comprising:
receiving feedback associated with the first plurality of search results; and
selecting, based at least in part on the feedback, a first attribute-value pair from the first plurality of attribute-value pairs as an additional filter element,
wherein the filter interface includes the additional filter element.

20. The computer-implemented method of claim 19, wherein selecting the first attribute-value pair includes employing a trained machine learning model.

* * * * *